(12) United States Patent
Mossman

(10) Patent No.: US 11,308,112 B2
(45) Date of Patent: *Apr. 19, 2022

(54) INTERACTIVE LIBRARY SYSTEM AND METHOD OF INTERACTIVE, REAL-TIME CREATION AND CUSTOMIZATION

(71) Applicant: Micah Mossman, Woodbridge, VA (US)

(72) Inventor: Micah Mossman, Woodbridge, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/893,134

(22) Filed: Jun. 4, 2020

(65) Prior Publication Data

US 2021/0026848 A1 Jan. 28, 2021

Related U.S. Application Data

(63) Continuation-in-part of application No. 15/915,064, filed on Mar. 8, 2018, now Pat. No. 10,732,993.

(51) Int. Cl.
*G06F 16/248* (2019.01)
*G06F 40/12* (2020.01)
*G06F 8/61* (2018.01)
*G06F 16/93* (2019.01)

(52) U.S. Cl.
CPC .............. *G06F 16/248* (2019.01); *G06F 8/61* (2013.01); *G06F 16/93* (2019.01); *G06F 40/12* (2020.01)

(58) Field of Classification Search
USPC ........................................................ 717/164
See application file for complete search history.

(56) References Cited

U.S. PATENT DOCUMENTS

| | | | |
|---|---|---|---|
| 5,297,249 A | 3/1994 | Bernstein et al. | |
| 5,864,856 A | 1/1999 | Young | |
| 5,963,205 A | 10/1999 | Sotomayor | |
| 5,991,713 A | 11/1999 | Unger et al. | |
| 7,020,320 B2 | 3/2006 | Filatov | |
| 7,130,861 B2 | 10/2006 | Bookman et al. | |
| 7,272,851 B2* | 9/2007 | Gomez | G06Q 10/06 726/5 |
| 7,401,286 B1 | 7/2008 | Hendricks et al. | |
| 7,409,337 B1 | 8/2008 | Potter et al. | |
| 7,571,174 B2 | 8/2009 | Arumainayagam | |
| 8,181,242 B2* | 5/2012 | Gomez | G06Q 10/063 726/21 |
| 8,423,353 B2 | 4/2013 | Itakura | |
| 8,671,357 B2 | 3/2014 | Spetalnick | |

(Continued)

*Primary Examiner* — John Q Chavis
(74) *Attorney, Agent, or Firm* — Jonathan Brown

(57) ABSTRACT

An interactive library system comprised of a Processing Engine phase, a Presentation Engine phase, a Content Management phase, and a Content Editing/Reading pages phase, which work together in real time. The system, by providing a set of structures within an overarching database, provides the flexibility to build any data set (library) within an overarching data schema. The system proactively presents information to a user in real time as the system constantly scans to finds library matches to user text, saving the user from having to actively search and confirm information and greatly enhancing data handling capability. Further, each user has the flexibility to create a library most relevant to a user's particular position and needs, and select information for retrieval most useful to them.

16 Claims, 33 Drawing Sheets

(56) References Cited

U.S. PATENT DOCUMENTS

| | | |
|---|---|---|
| 9,176,938 B1 | 11/2015 | Kerschen et al. |
| 9,361,291 B2 | 6/2016 | Puppin |
| 9,613,022 B2 | 4/2017 | Stewart et al. |
| 2005/0154742 A1 | 7/2005 | Roth et al. |
| 2006/0235855 A1 | 10/2006 | Rousseau |
| 2007/0288106 A1* | 12/2007 | Gomez .................. G06Q 10/10 700/90 |
| 2009/0327240 A1 | 12/2009 | Meehan et al. |
| 2011/0087704 A1* | 4/2011 | Bishop .................. G06F 16/951 707/797 |
| 2011/0251837 A1 | 10/2011 | Conboy et al. |
| 2014/0142924 A1 | 5/2014 | Friedman |
| 2016/0110344 A1 | 4/2016 | Tseng et al. |
| 2016/0117697 A1 | 4/2016 | Briere et al. |

* cited by examiner

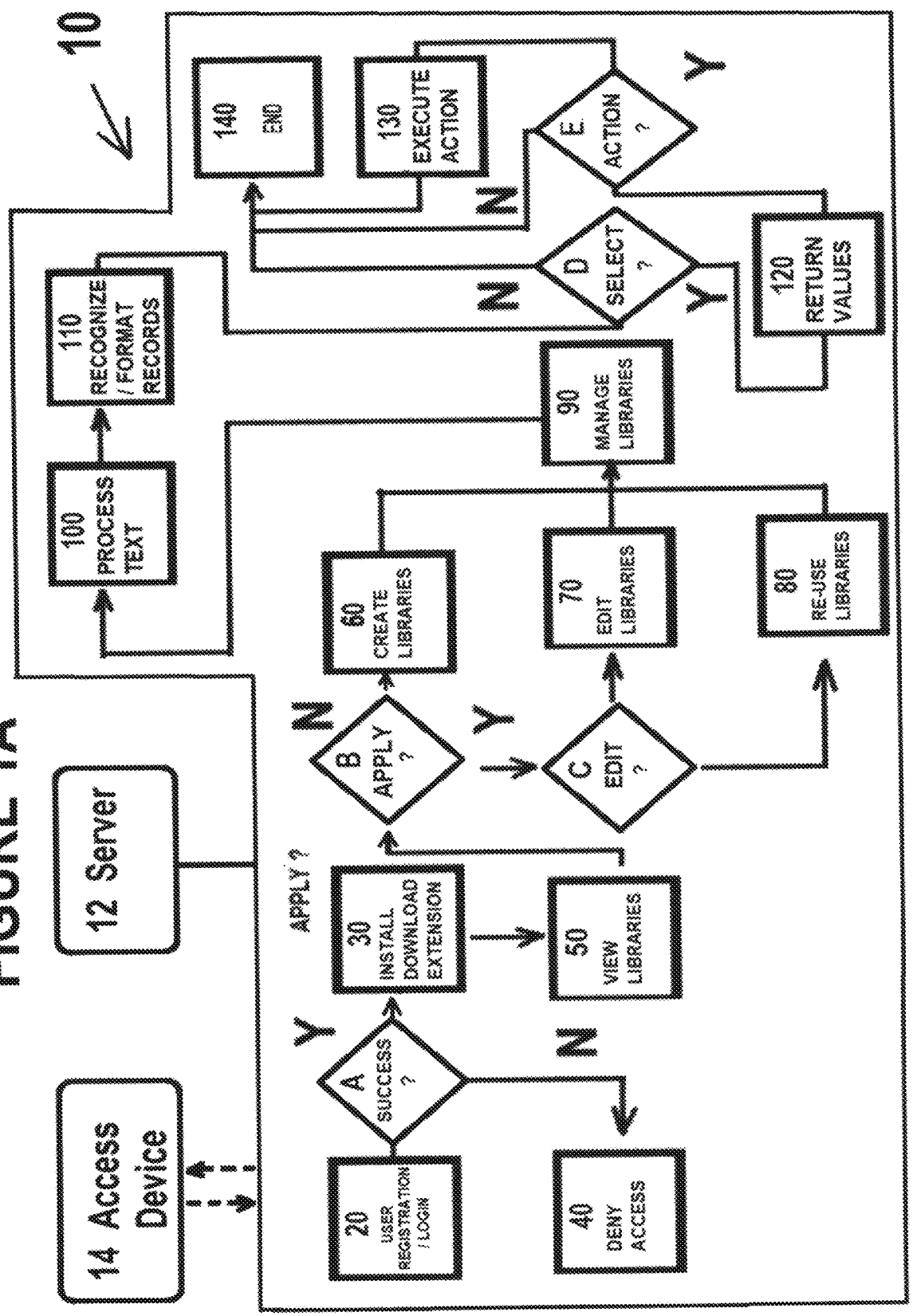

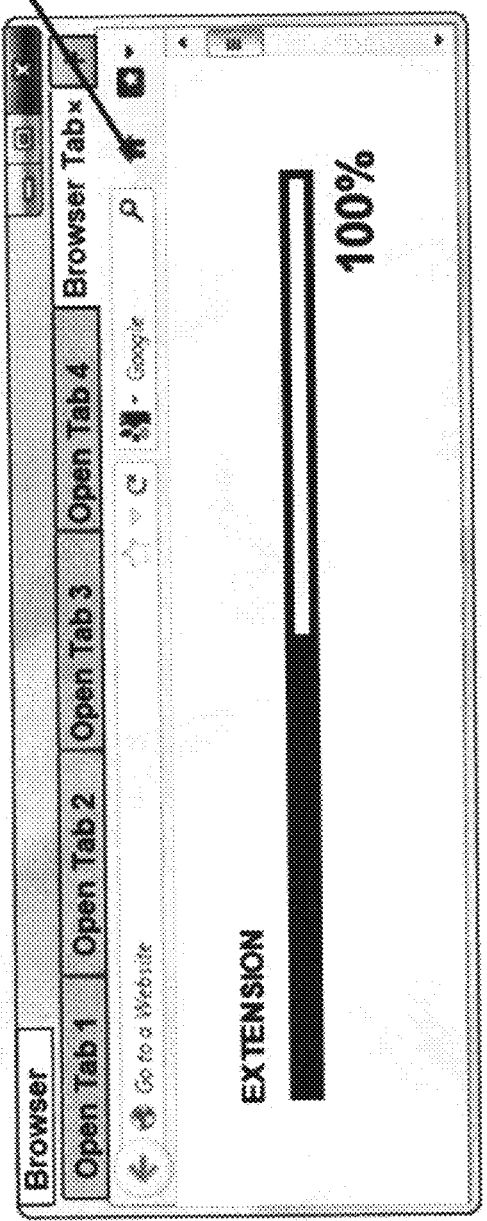

Step 160: Create personalized Library

161 Library Creation Interface

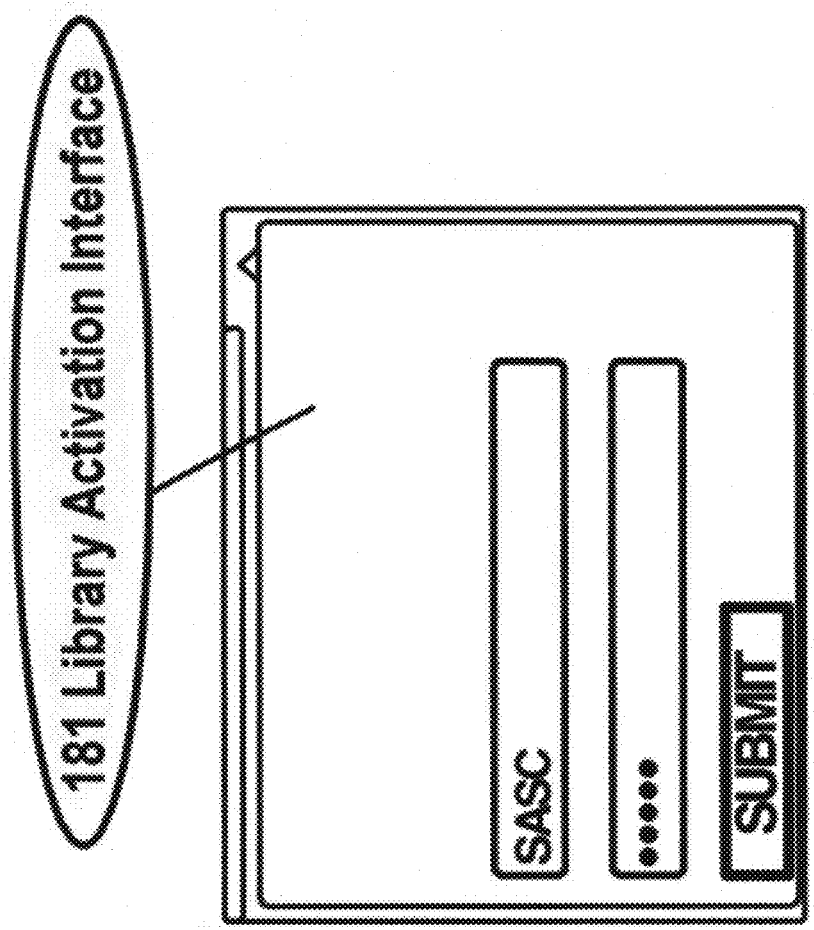

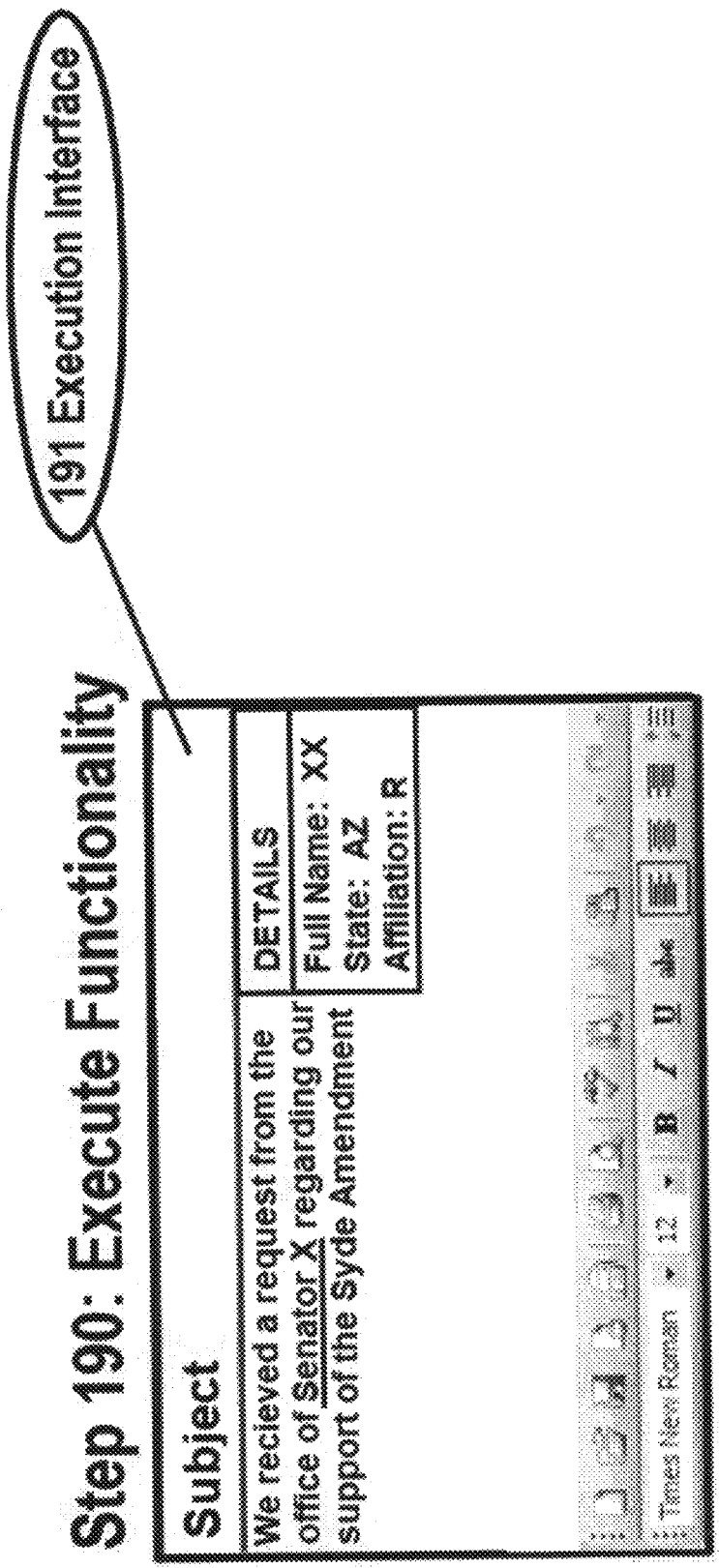

FIGURE 3C

312 Populated Library (with values)

OVERALL PROCESS

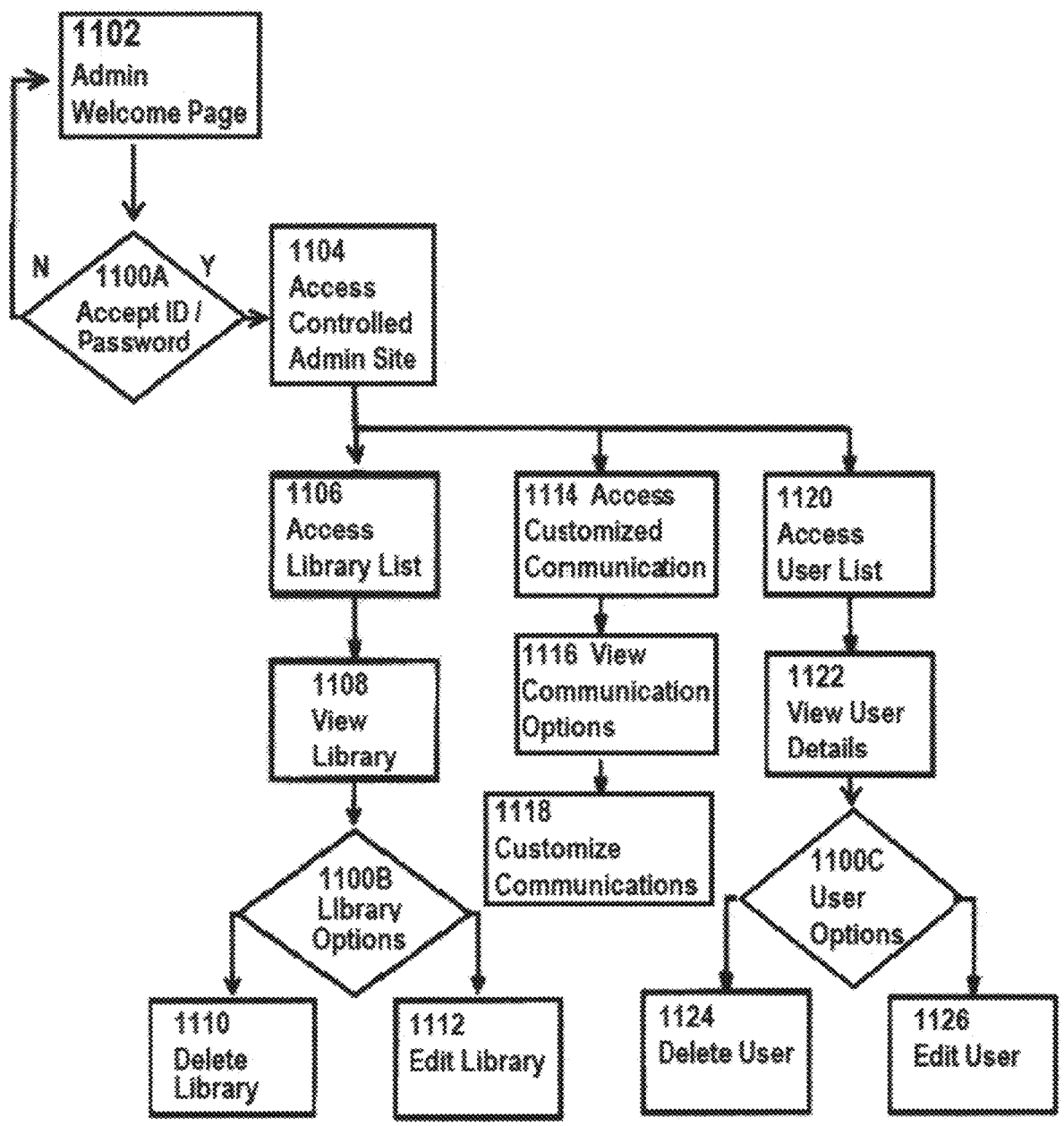

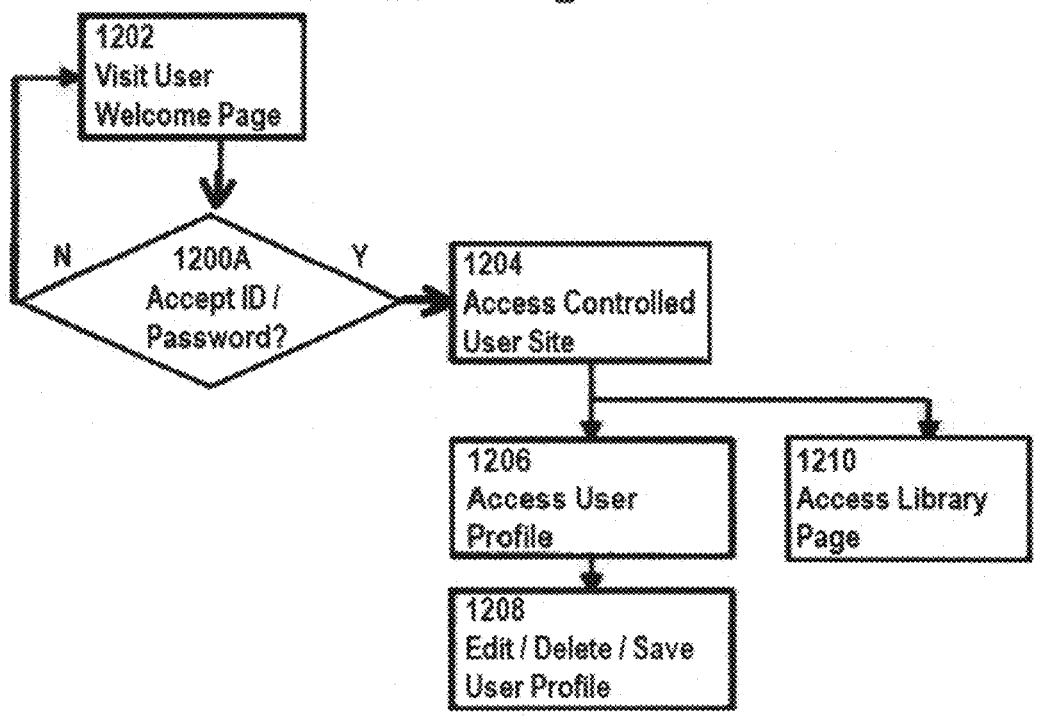

1300 Library Management

FIGURE 4G

Records / Attributes

| EXEMPLARY RECORDS | EXEMPLARY ASSOCIATED RECORD ATTRIBUTES |
|---|---|
| Personal Contact Names | Contact Phone Number, Address, Age, etc. |
| Software Application Tiles | Software Creator, User Base, Functions, etc. |
| City Names | City Leadership, Population, Export, etc. |
| Politician Names | Politician Party, State, Donors, District, etc. |
| Football Quarterback Names | Quarterback Team, Passing Yards, Touchdowns, etc. |

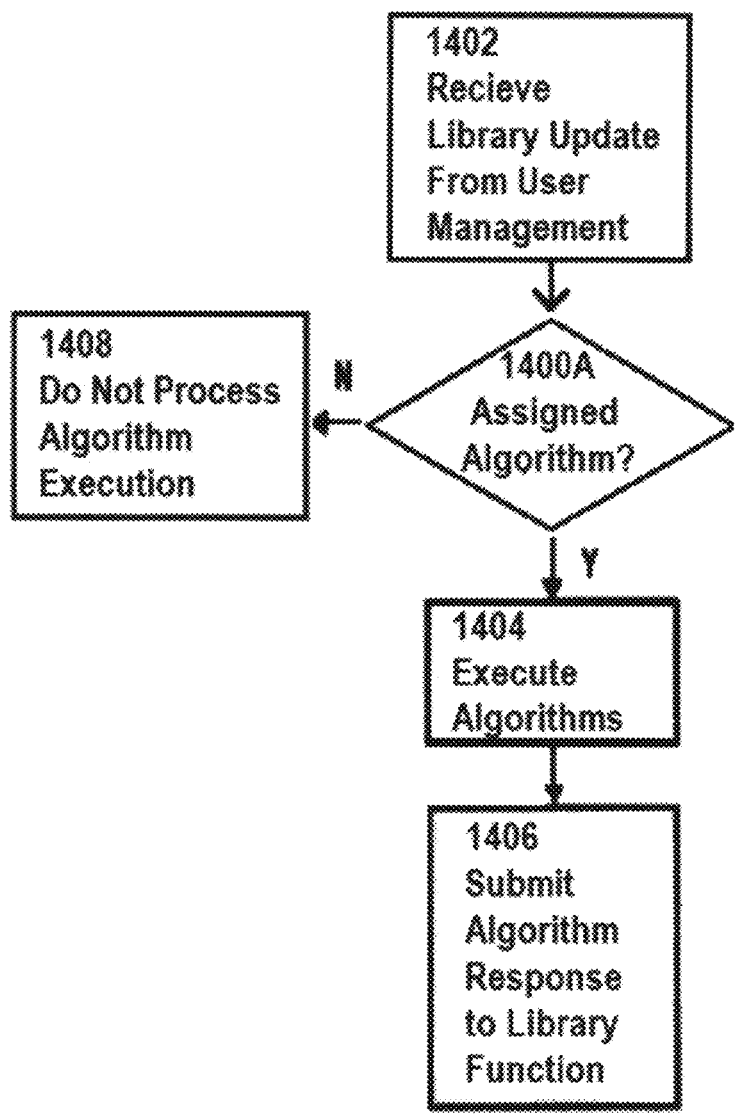

1500 External Source Management

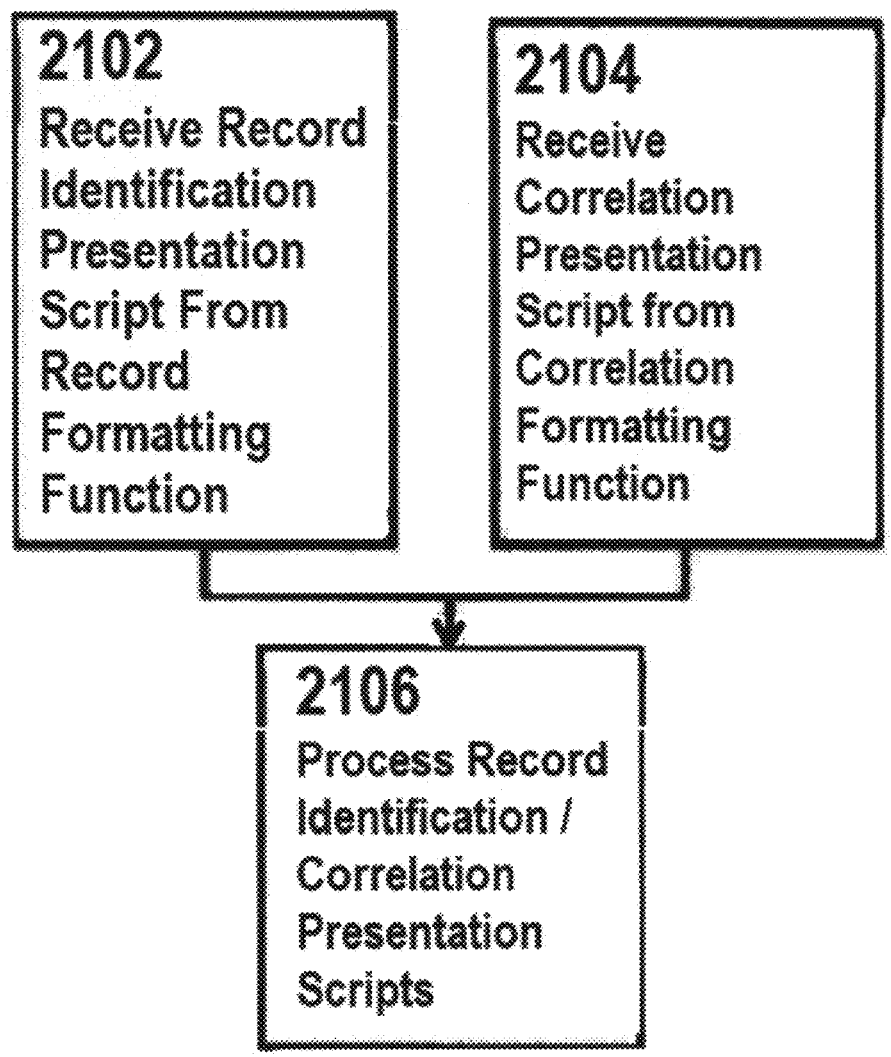

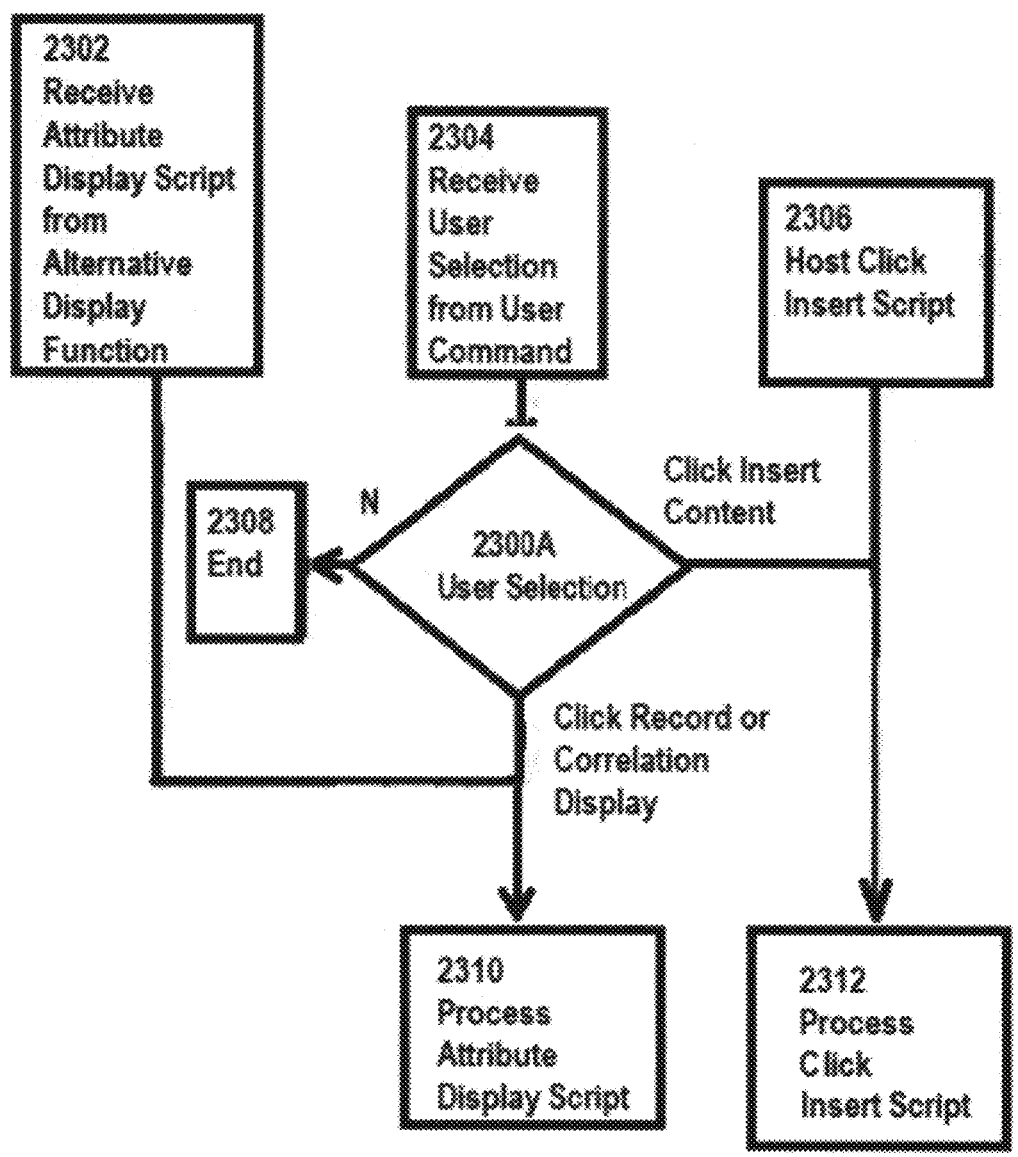

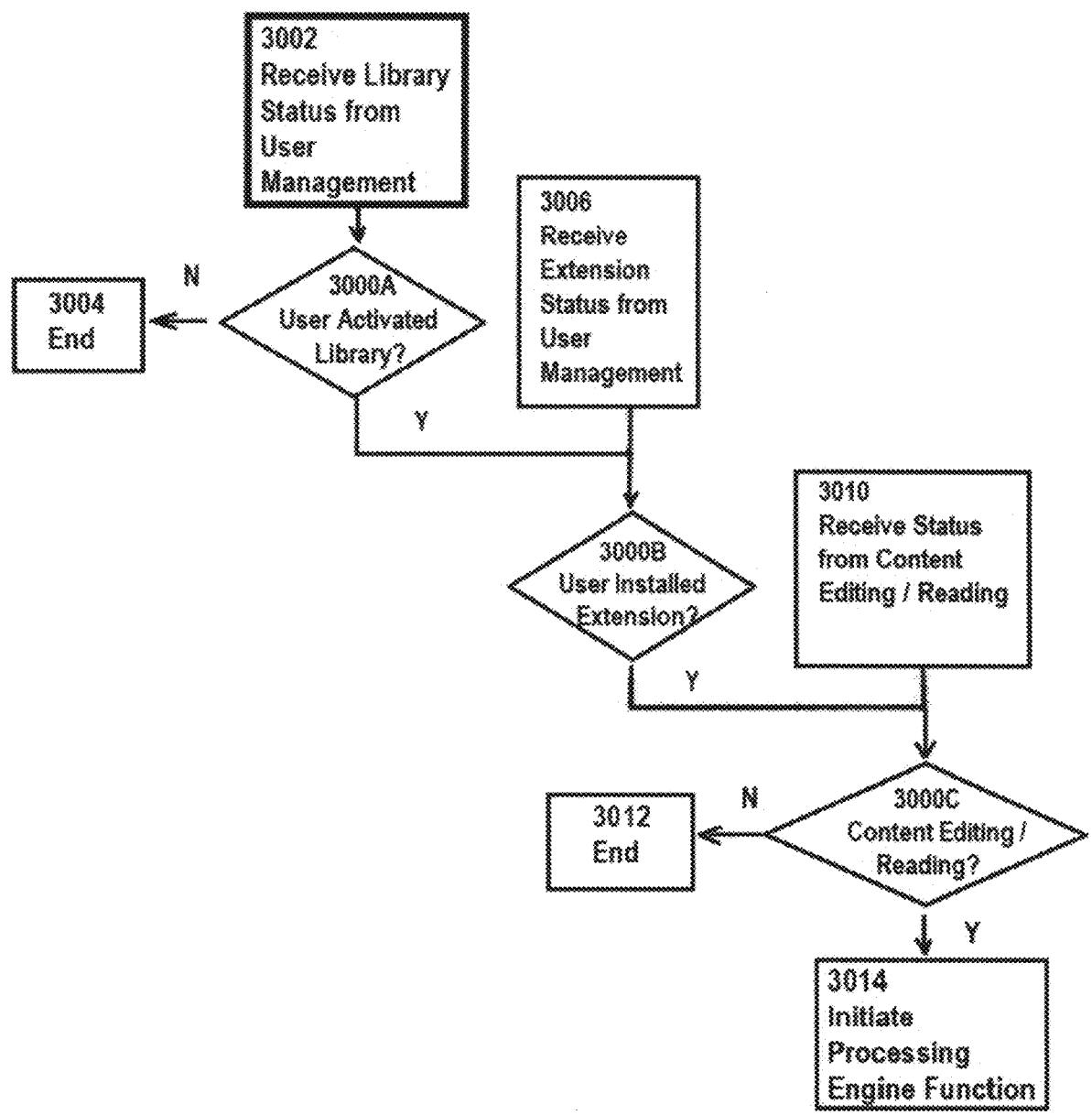

3100 Content Code Reference

3300 Cross Correlation

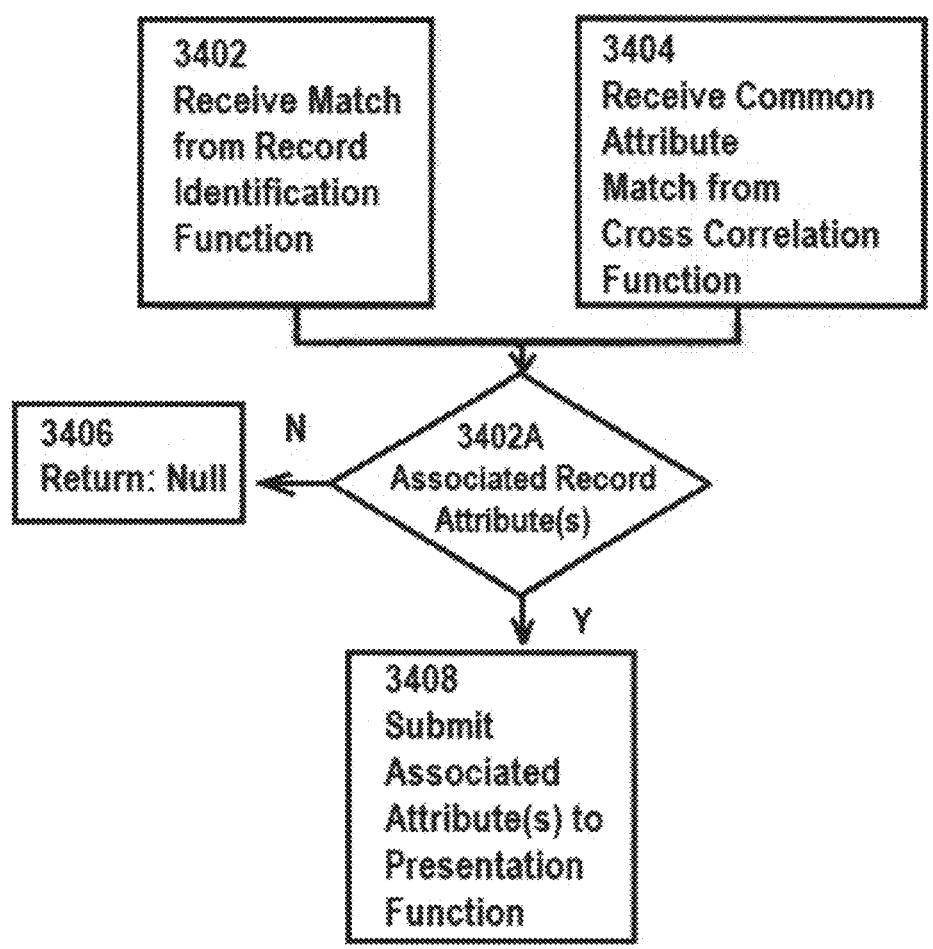

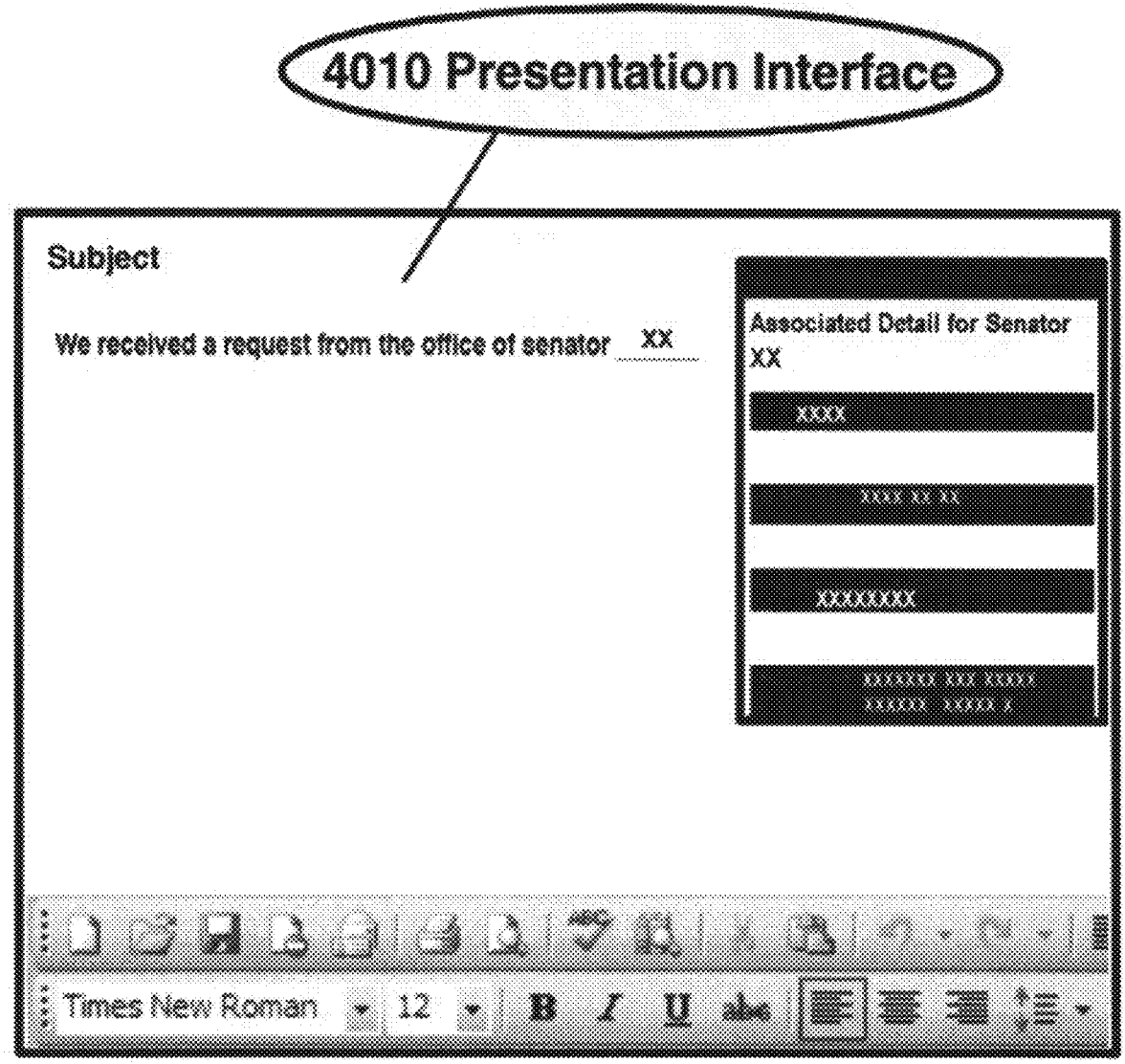

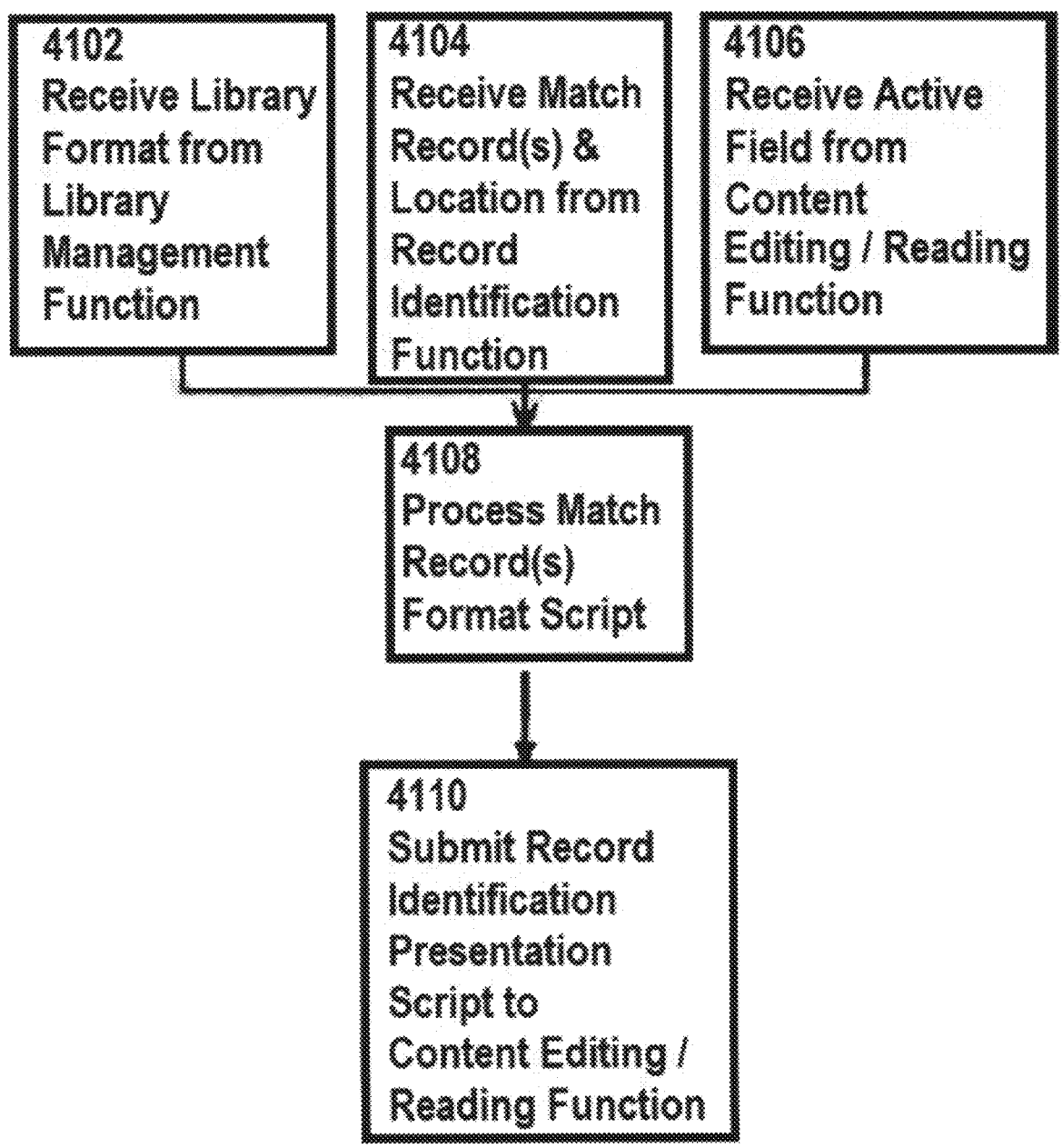

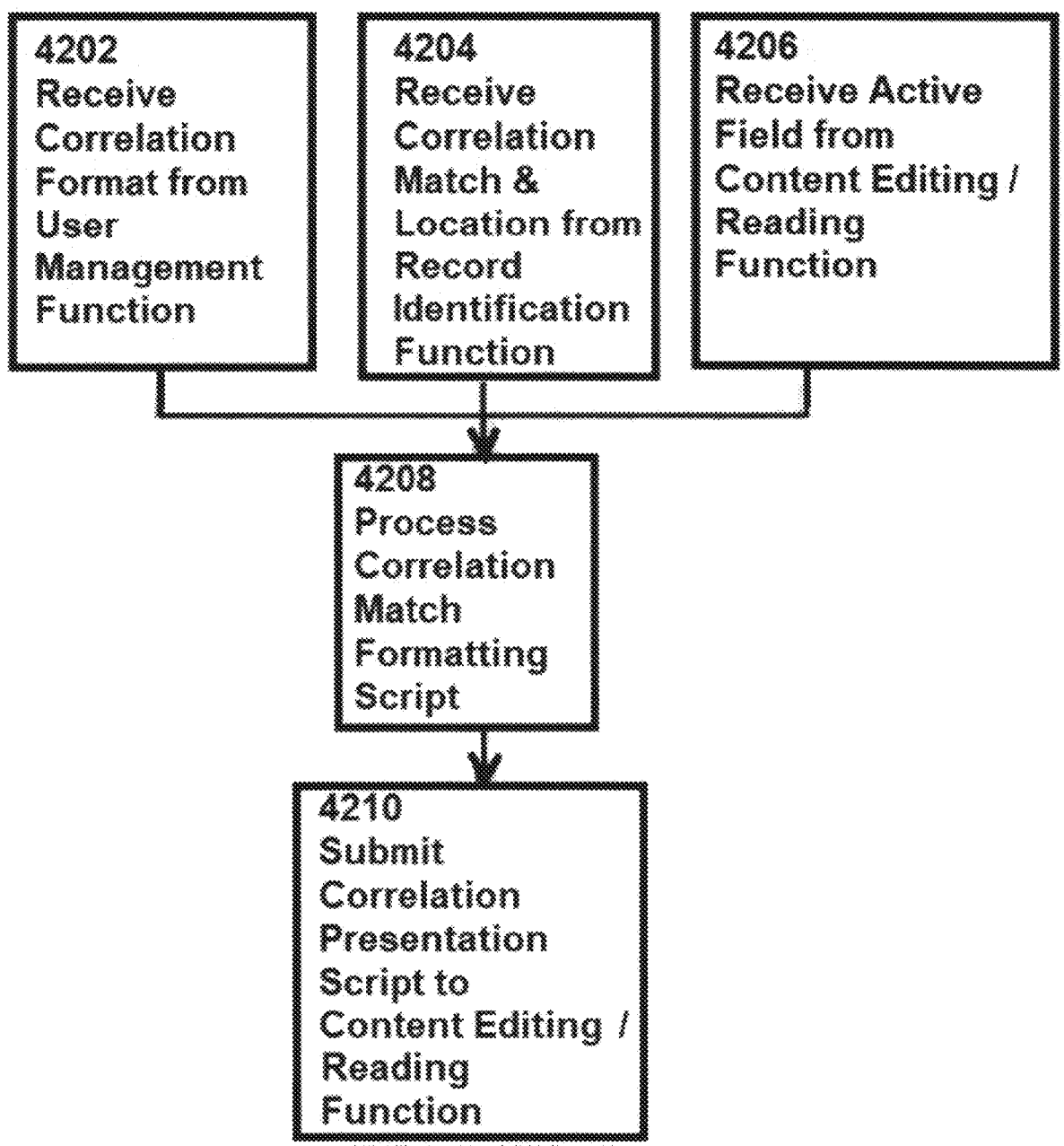

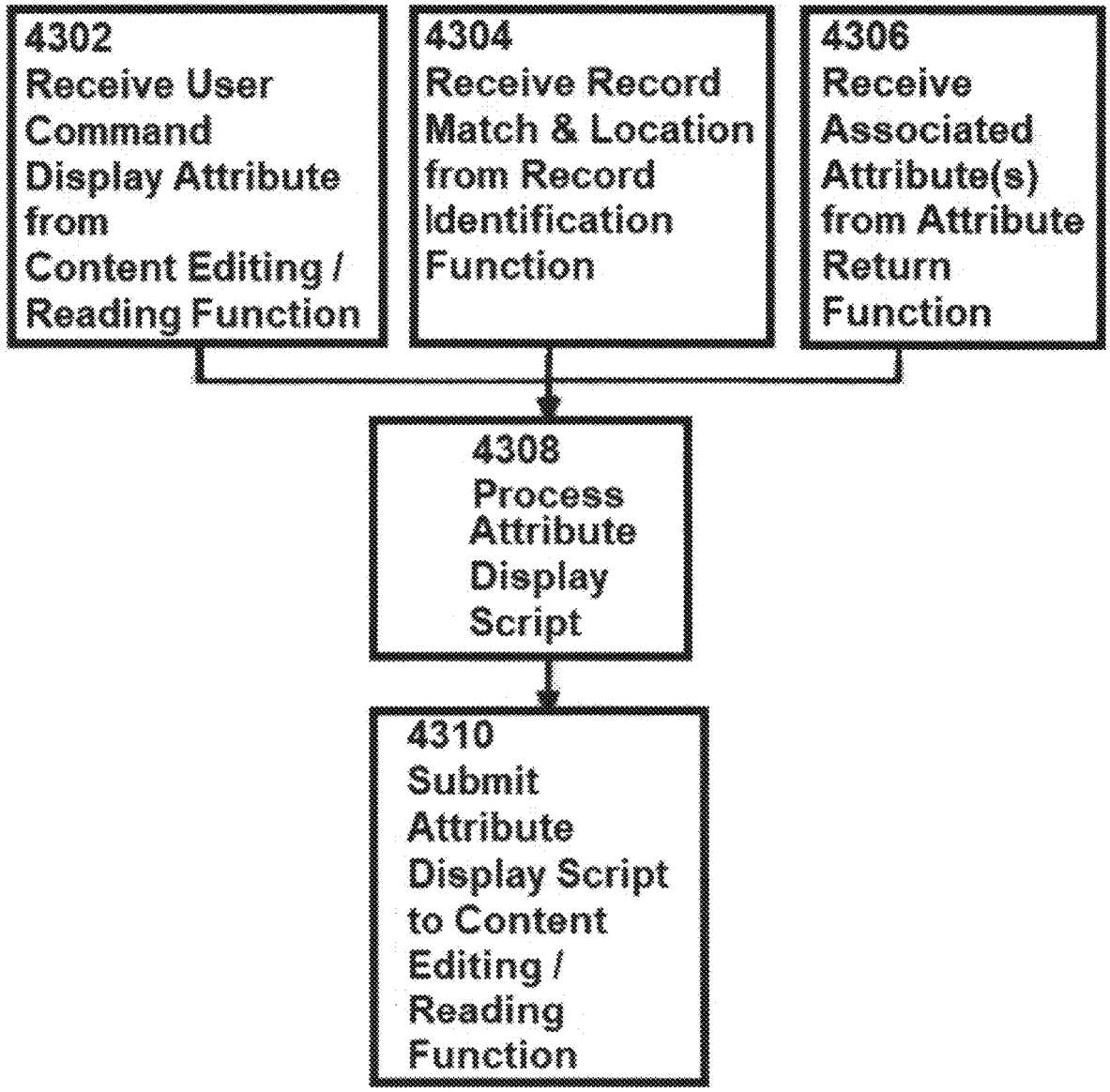

OVERALL PROCESS

INTERACTIVE LIBRARY SYSTEM AND METHOD OF INTERACTIVE, REAL-TIME CREATION AND CUSTOMIZATION

CROSS REFERENCE TO RELATED APPLICATION(S)

This application is a Continuation in Part of, and claims the benefit of, U.S. Utility application Ser. No. 15/915,064 entitled "INTERACTIVE LIBRARY SYSTEM AND METHOD OF INTERACTIVE, REAL-TIME CREATION AND CUSTOMIZATION," filed on Mar. 8, 2018. The subject matter of this application is hereby incorporated by reference in its entirety.

TECHNICAL FIELD OF THE INVENTION

The present invention relates to the general art of software and desktop applications, improved functionality in the area of custom data libraries, and accompanying processing for search and retrieval functions.

BACKGROUND OF THE INVENTION

With advancing computer technologies, computer users have become more and more interested in, and demand has grown for, interactive functions and improved data processing and manipulation for a variety of tasks of varying complexity. There has been growth, and interest in furthering of capability, in areas such as analytic processing of data. These technologies have increased execution rates for text recognition, content match, and information retrieval functions. Data that can take users further abounds within countless data sources. Similarly, the number of devices with the potential to call upon those data sources has multiplied exponentially. Pieces of data, such as specific words or phrases, can be matched, recognized, and brought to the attention of a user with increasing velocity and frequency.

Moreover, current computer technologies are facilitating human interaction via an increasing variety of digital communication platforms, such as e-mail, social media, and e-publishing, which can be accessed and executed via a number of devices including PCs, tablets, laptops, and smartphones.

However, while some of these technological functions have been employed for decades, the user experience with both computer processing and digital communications can still be somewhat random and falls short in delivering the user information that could assist or inform them when they need it. Accordingly, these technologies have not met their potential. Even with unprecedented access to data, digital communications fail to make full use of available and relevant information.

Users typically obtain needed information by typing searches into search engines is (e.g., Google™) or other systems or platforms such as an online or desktop database. However, this method depends on the user knowing what it is they do not know and what they need to know, as well as knowing enough to form and execute a correct search. However, that a user is searching a topic is itself a self-evident indication that they may not have knowledge of that area, such that they may not know what they need to know or search for. In other words, the user may have a situation in which, to use an expression, they "don't know what they don't know" about any given topic. This can result in large knowledge gaps, underinformed or even misinformed users, wasted time searching, and inconsistent or incorrect search results.

This failure can also be attributed at least partly to the extra effort required for people to actively seek out relevant detail for communications support, such as additional reading or research. Users may not have the extra time for such research or may not see it as a priority compared to other items. Further, readers may not explore, gather, and/or organize data in an area because users, not knowing the information, do not know its importance.

Accordingly, as users work with data—for example, while writing a document or creating a spreadsheet—it is possible, or even likely, the user will have knowledge gaps with their subject matter because they do not have time to close the gap, they underestimate the importance of the gap, or they are unaware the gap exists.

Users generally only search for information associated with a key term (i.e., "Record") they are typing or reading when the user has a knowledge gap the user is aware of or when communication circumstances are critical enough that validation of information is required. The result is that communication often lacks the full insight of information that is available in the real and digital world. If users need to seek out information, they sometimes lack the understanding to do so effectively—particularly when searching sources that are unfamiliar to them (e.g., governmental or internal databases as opposed to a well-known source such as Google™). For that matter, the user may not even know such information exists.

Some technologies have attempted to enhance digital communications with continuous information retrieval and presentation solutions to provide related information to users in real time. For example, Grammarly continually accesses a database of grammar and spelling that provides suggestions to text. Similarly, All Are Green provides political information as specific terms, such as the names of political figures, are entered.

However, these typically rely upon a singular database that is set up and edited by an external administrator to which a user platform is linked. These have serious limitations in addressing user knowledge needs. Because they rely upon a single database with external control, such limited systems can satisfy only a singular knowledge need in an established domain (e.g., grammar or politics), and not necessarily as completely or in a way a specific user may want. Extending the text recognition, content search, and information retrieval functions of these systems to increase or alter function or data is prohibitively cumbersome, requiring code creation from scratch, replication, and/or manipulation that cannot easily be performed by a typical user.

Because of the limited scope of these systems, a user can still have many data "blind spots" or simply not have the interactive control and retrieval of the types of data or preferred sources that would result in an optimal experience. Accordingly, what is needed is an effective method and apparatus that can expand computer capabilities in such processing and retrieval through integration of these functions and needs, providing opportunities for increased insight that can be applied to their digital communications, which can render near-continuous processing and informing to enrich the relevance and accuracy of such digital communications.

SUMMARY

An electronic machine-based, interactive user library system and method of interactive creation and customization is herein disclosed and described.

This system improves computer functionality and real-time data availability by providing relatively seamless integration of user-defined content into a general auto-query, content search, and Attribute Return Technology functionality—for application to existing, as well as new, computer program applications, particularly Content Editing and Reading services.

The interactive user library system can facilitate user creation and integration of custom data libraries into content recognition and data attribute retrieval software. This invention serves to increase available data, data relationships, and recall queries to enhance computer processing, along with the user's digital communication experience. The invention is a method and apparatus that incorporates a software application to enhance the current functionality of devices, servers, and processors by increasing the is volume and frequency of search and return queries and employing topically-unlimited and user-defined-or-created content libraries to enhance digital communications within any form of Content Editing and Reading fields, such as editing or reading documents, social media posts, web pages, or spreadsheets. The invention's utility is enhanced through its incorporation into a typical configuration of Account Management, Content Editing/Reading Pages, a Processing Engine, and a Presentation Engine. Through this invention, users may create and populate content libraries, either manually or via another data source such as an external database. Users also may accept or modify existing libraries. The library will integrate into the system to facilitate real-time search of the library as a document, spreadsheet, or the like is being worked on—of any form of active Content Editing/Reading fields for Records from the library (or Portfolio of Libraries)—and return Record-Associated Attributes of any suitable format.

In a preferred embodiment, the interactive library system is comprised generally of at least one electronic device with user interface, such as a server, PC, laptop, tablet, or smart phone. The system can either be placed on a central server or other electronic device and accessed from the server by an access electronic device, or placed on and accessed by the same electronic device.

In either case, the system enhances the capabilities of the server and/or access device by making either device capable of finding and providing information about data connected to Records for which a user may not otherwise be aware.

The system further comprises generally a User Registration and Software Download/Access phase, a Library Administration phase, Text Processing and Library Interface phase, and a Presentation Execution phase.

In an initial user registration/login step, a user on an access device accesses a server, or directly accesses the interactive library system from their own device, is typically first provided with a registration interface, and completes a registration through steps typical of a registration to download software or join a platform, including providing information such as an email, ID, or password, and possibly accepting terms or a licensing agreement.

If the user is unsuccessful, then access is denied and the user can either quit or repeat the registration/login step. If the user is successful at registration/login, then the user proceeds to download and install any extension software of the interactive user library system, or other items required for the system, or any such items are automatically loaded upon successful completion of registration/login.

In one embodiment, the extension can be installed via browsing software. In another sample embodiment, the software can be downloaded from an app store, and in yet another, by a "drag and drop" procedure.

After any required software is installed, the user is shown, and can view, any pre-made or pre-created libraries. A listing of libraries, or types of libraries, will appear on a user access device screen. The user may browse libraries by a direct search function, by category, by alphabetical order, or by other suitable categorization and listing method. When a user becomes interested in a library, the user can choose to see more complete detail about that library. The user can then proceed with that library or return to their browser and choose another one.

Upon review of available libraries, the user can decide whether to apply an available library (or set of libraries).

If a user decides "no" to applying a library for use, the system then provides an option to create a personalized library.

A first column in a library interface is a "Records" column with a set of individual Records. Records are members of an individual library or library family. For example, the employee name "Greg" might be a Record within the library.

Following the Record column(s) is a subsidiary Attribute row. "Attributes" are the field(s) used to provide further elaboration of the Records of the Record column within the library interface. As an example, the sample Record "Greg" may have Attribute row(s) labeling further information about "Greg" (e.g., Address, Phone, or Birthday).

"Values" column(s) appear beneath the Attribute row(s) and provide the specific value(s) or form(s) of each Attribute. For example, if "Greg" is the Record in the employee library, and "phone number" and "address" are Attributes of the Record "Greg," the values of these, for example could be "555-2233" or "227 W. Poplar Street."

The library in an embodiment appears as a reference table of information in a first column with several types of Records listed, and a second column with examples of associated Attributes of Records, which further define that Record with assigned values are shown.

There are several types of Attribute values, depending on how they are acquired. If a value is manually entered into the table by a user, it is an "Original value." If a value is automatically acquired or added from another data source, such as a website or external database, it is a "Feeder value." If a value is arrived at based upon a function or functions being applied to one or more Original or Feeder values, it is a "Derivative value."

At the "Create Libraries" step, a user, instead of needing to rely upon a pre-set library of limited utility, can create a customized library or libraries of their own. Herein, the term "library" should be taken to mean library of libraries. When the interface for the interactive library appears, the user can populate the Record and Attribute fields with suitable values. This can be done, as referred to, by directly imputing the values, by downloading value data from an external source, or through using a pre-set function. If the user chooses to download value data from an external source, the user assigns a feeder or feeders and what values will be attained from the feeder or feeders, and can create or assign algorithms for any function to be used.

After the user creates a custom library, the library is added to the system. The user can choose to re-use a library in the system (including the newly-created library), create another library, or proceed to "Manage Libraries." At the Manage Libraries step, the user can work with a library or libraries by doing such things as ordering, arranging, acquiring, assigning formats, or deleting them.

In an embodiment, to create a library, the user can log into an admin page, create a library file by supplying information such as name, email, and a password to the library, and/or add Records and associated fields to the Records. In an embodiment, to activate the library, the user can log into the library by any accepted means in the art, such as clicking on an icon or using title and password.

If the user decides to apply a pre-existing library or set of libraries, the system then provides the user an option to edit the applied library or libraries.

If the user decides to "edit" the library, the user advances to an editing interface. The user can access and make any chosen alterations to an existing or even newly-created library, including adjusting Attributes and values. The user can do this or can access an external source capable of automatically adjusting the Attributes and values. The user can also copy the existing library into a personal portfolio. Accordingly, the user may alter or adjust a library that is used more universally to personal preference. For example, the user can access a library of a company's employee directory, copy it into a personal portfolio, and make personal notes or value adjustments without affecting, or having them show, in the company library.

If, upon reviewing an existing library, a user chooses not to edit or further edit a library, the user can accept the accessed library and apply the library for re-use.

Once the user processes the library, the user is presented with an interface to manage any libraries. In this step, the user can handle other details related to the library, such as inviting other users to the library, customizing the library, and prioritizing return of duplicate Records from different libraries (so that a common Record that exists within multiple libraries will present alternatives for the user to select, in order of the library's order).

Upon signifying completion of any desired Library Management tasks, the interactive system provides the user an interface to process text.

As a user performs functions, such as reading, editing, or otherwise working on a document or website text, the user's text of the document, website, or other task is processed by continuously comparing it to the library text to determine if there are any matches.

When a match to the library is found, the system matches the task text to a specific active library Record by using a "Recognize/Format Records" step. The matching portion of the task text is re-formatted to signal the match (e.g., by underlining the text in a user-selected color, such as red).

Once a text match is signaled, the user can decide whether to select the re-formatted text and learn about the matching data.

If the user decides not to learn about the matching library data, the process moves to the "End" step and terminates. The user may continue with the document, or if finished with the document, end use of the interactive library system.

If the user decides to examine the matching library data, the user can request that the interactive system supply Attribute information about the matching Record with return values. The user can click, scroll over, or otherwise act, initiating display of all the associated values information to the user.

In one embodiment, the user can click on a system-formatted word or an icon via an execution interface to see the associated information for a system-recognized to Record.

Moving to the next decision node, the user can decide whether to simply review the additional data from the library or act to incorporate the data into the task text. If the user decides not to take further action, the process again moves to the "End" step and is terminates. If the user decides to execute action, the value data, such as Attribute title and value, or a portion thereof, are added to the text for the user to review. Similarly, the Attribute values may be added with a contact card profile or other suitable method as known in the art.

As a brief example, an organization may define a library by feeding content from its HR database into one. When a user is authoring an email to an employee, the system will automatically search the library in real-time as the email is being drafted. The system will recognize any Record and provide associated Attributes for any same or similar terms in the email, by first formatting the matched Record for the user's attention. The Record, or an icon leading to the Record, may appear on the email screen at the term that matches. The user can then ignore the information or can command (e.g., via clicking on the formatted name appearing on the screen) the system to display associated Attributes from the library.

For example, an employee name may result in a match in the library, and the user will be given a notification that the name, such as Jane Doe (i.e., Record), has a library match and is then given the option of providing further information (i.e., Attributes, such as Contact Information, Salary, Family Information, or Performance Scores) for Jane Doe. Additional features allow the user to insert any desired retrieved content into the "Content Editing" fields of what they are working upon, or share libraries of information, or even cross correlate content between multiple libraries to identify instances where more than one Record on the active Content Editing/Reading pane share a common Attribute from user-activated libraries within their library portfolio.

From an operational perspective, in an Account Management phase, a user can use the access device to manage any of multiple account aspects, such as share a library or libraries and manage library preferences. This can be done internally or externally, via suitable ways such as accessing the internet with the access device or desktop application with interface on the access device, and these functions can be done by a user and/or administrator.

In a preferred embodiment, a user can manage and access their personal accounts from the access device to include and alter personal information and libraries, and Account Management Administrators may manage user access and communications within the system from the server or access device. The user-activated library or libraries serve as the collection of data against which the computer will analyze, search, correlate, and return results as a user is reviewing or working on a document, spreadsheet, or the like. "Account Management" (and its associated sub-functions) operates consistent with controlled and customizable web and desktop applications, such as email, social media, document drafting, and other suitable functions.

The associated sub-functions of Account Management, overall, comprises a collection that includes the following: Administration Management, User Management, Library Management, Algorithm Execution, and External Source Management. A number of these features of the interactive library system, and steps underlying them, do not operate in isolation, but are interactive with other features, with labeled "steps" sometimes being taken back and forth between steps or phases of the system. If a user wants to manage account details or information, the user typically enters an Administration Management phase. Upon entering, the user logs into or enters the system. In this embodiment, the user enters a welcome page interface and the user (manifesting as an administrator) enters login credentials. If the system accepts the user's ID/password, the user proceeds to an access-controlled site. From the controlled access area through which administrators and/or the users have the rights and privileges, the administrator and/or user, via the server and/or access device, can observe and manage (e.g., delete, deactivate, etc.) user accounts and/or a library or libraries. Additionally, administrators may manage interface communications, including but not limited to content postings (e.g., Privacy Policy, Terms of Use, Tutorial Media) and web text (e.g., welcome message to suitable parts of the system).

From here, the user or administrator is offered the options of customizing library content, communicating with the system users, or managing user account(s). If the user wants to customize a library or libraries, the user can access a library list interface and view the library or libraries. The library system presents the user library options, from which a user can either create a new library or edit a current library.

If the user wants to access content communication features, the user can proceed to access customized communications interface, view communication options, to and from there, customize communications to user preferences.

If a user wants to manage a user account(s), the user can choose to access the user list and view details of a user or users. Similar to the library list, the user has a user option and can choose whether to delete a user file or edit the user.

The "User Management" phase provides a user account feature to edit his or her user profile. The User Management phase is based upon individual access controls established by the user, through which the user can access, create, manage, or delete his or her account. The user accesses this area by engaging a user welcome page interface and an established login. If the login is accepted, the user proceeds to a controlled user site. The user can access their profile from here, or proceed to access a library page to obtain further user information. After the user has accessed the user profile, the user is provided an option to edit, delete, or save the user profile.

"Account Management" includes viewing preferences, analytics/correlation preferences, and profile revisions. "Account Login" serves as the control mechanism by which individuals can access their personal account only upon rendering the appropriate authorization credentials.

In the "Library Management" phase, a mechanism is provided through which the user is able to create a new library, modify a library (e.g., content, presentation settings, or algorithms), accept a public or shared library, or edit a library. Each library includes content for Records and associated Attributes (of various working document formats, such as text, JPEG, Word, and the like) captured via common categories. Such content manifests predominantly as text, but may include digital signatures associated with image, video, or other formats.

The user enters the Library Management phase via a library access page. Among items the user can review are the library description, algorithms, and content. After entering the library page interface, the user can accept a public or shared library, or create a library. Acceptance of a library enables the user to efficiently replicate an authorized library or libraries not created by the user, within the user's personal "Library Portfolio" to enhance access to information and corresponding scope in its functionality.

By choosing to accept an internal, shared, or public library, the user then has a library present within the user's Library Portfolio. The user then has a choice whether to edit the library. If the user chooses to edit the library, the user can update Records, Attributes, or other features of the library. "Library Editing" allows the user to modify content (e.g., add, remove, change), algorithms, and settings (e.g., presentation colors, order) for created or accepted libraries within the user's Library Portfolio.

Whether the user chooses to edit the library or proceed without editing, the accepted library is activated. The user can then decide whether to share the library. If the user decides to share the library, it can be published for others to access. The library is then submitted to a Processing Engine for processing its functionality within user Content Editing or Reading pages.

If a user chooses to create a library rather than share it, the user enters an interface to create a library. The user can decide whether to create a library, or import a library or partial library, from an external source. If the user decides to obtain a library from an external source, the user can choose a source for the library by assigning external source feeds. The user can receive content from an external source management. The user can also submit source feeds to an external source for management tasks.

Whether an internal library is used or an external library source is imported, the library is populated with Records and related data. "Library Creation" may also include the assignment of select algorithms to apply against one or more data fields, to render a distinct and derivative "Record Attribute." This feature will be discussed later in greater detail. Upon creating a library, the user can then activate it and move on to decide, as is the case with a shared or public library, whether to share the library. "Sharing/Publication" of a library facilitates communication and controlled distribution to others via email, posting to a site, or other digital communication channel.

In one embodiment, Library Creation includes both manual and ingested Record and Attribute data, with which the user populates fields of Records and associated Attributes.

This invention's Library Management features differ from others in the sense that users do not have to manually assign associations within a content editor. Rather, associations are actively and continuously searched as digital content emerges within the Content Reading or Editing field and compared against Records within the user's Library Portfolio.

This invention's Library Management features further differ from others which work with fixed content and a fixed central database. Part of the uniqueness and utility of this solution lies within the combined limitless association of Records to Attributes (captured within "Libraries") and code-less integration of such data into "Content Recognition and Retrieval Technologies." This invention's Library Management features differ from others in the important respect that this invention does not rely on cumbersome categories for search, but rather displays exact data matches to Records, terms, numbers, words, and the like, based on user "Record Identification."

In an Algorithm Execution phase, an update and/or change of a library is received from the User Management phase or Library Management phase as the user enters the Algorithm Execution phase. Upon submitting a library—created or edited—the user either does or does not assign an algorithm, depending upon changes made or not made to the library. If an algorithm is not assigned, then it is not executed, ending this stage of the process.

The user can elect to apply a created or provided analytic function to generate further information from library date.

If an algorithm is assigned by the user, it will be executed, applied to one or more library fields, and derivative Record data will be returned. The Algorithm Execution feature processes user-assigned formulas, to derive new and distinct Attributes (from one or more Record-Associated Attributes) of the library. The executed algorithm then responds to the Library Management function, such that the resulting, derivative Attribute(s) will be consistently applied, along with original Attributes within this invention's "Presentation Feature."

Focusing on the "External Source Management" phase in greater detail, when a feed is received from the User Management phase to an external source, the feed is applied to a process of external content retrieval. In this embodiment, a user can assign an external data source to populate a library by either (a) submitting login credentials to commonly-utilized data sources, or (b) assigning one or more data feeds from one or more external data sources. The Library Management phase serves as the primary means by which content interchange with an external source(s) is established and maintained. This interchange can be established via engineered data feeds for links to unique external sources, such as an internal Human Resource system or access-driven data feeds which apply pre-engineered configurations to common sources (e.g., Facebook™ or LinkedIn™) that are accessible via user login credentials.

The external content is submitted back to the User Management phase to help update any chosen library(ies).

This invention's External Source Management phase differs from other prior art configurations that require a user to search for terms or content, locate additional resources for a term, constantly map external databases, or schedule regular merges of data for synchronization, in which a user's device is limited to these capabilities. Here, the feeding technology, and by extension the server and access device, are not bound to a specific function-derived database or databases, so that the system herein enhances the capability and searching power of these devices.

When the steps of the User Management phase are complete, the user may then, depending upon circumstances, move to the steps of the Content Editing and Reading pages, or if the library Record and Attributes are updated, directly to the Presentation Engine.

The Record or Attribute data is read and edited as needed via the Content Editing and Reading pages. In a first step, formatted Presentation script is received from one of multiple sources. Content Editing and Reading fields may exist in various formats and serve as display and interaction fields, in which this invention's "Presentation Features" operate. Content Editing fields are those in which users type digital content, and Content Reading fields are those in which users read or observe digital content. Content commonly manifests as text but may also include digital signatures associated with image, video, and other formats. A user can copy and insert Attributes into the Content Editing field by clicking on the applicable presentation-icon command. In addition to Record formats, the presentation feature also indicates relationships between numerous Records within the Content Editor or Reader field if they exist.

In an embodiment, formatted identification presentation script is received from the Record formatting function, or formatted Correlation-Presentation script is received from a correlation function after a Record formatting is complete. In either case, the system forwards the Record identification and/or Correlation Presentation script(s) for processing.

From within the Content Editing/Reading fields, a user submits commands to the system for Attribute return, insertion, and the like. In a User Command phase, the user may receive any of several possible scripts or commands, including an Attribute Display script from the Attribute Display function, user selection from a user command, or a host cock insert script.

If Attribute Display script is received, then the interactive system processes it to render Record-Associated Attribute Display script associated with the assigned user library. If the system receives a user selection via a user command, the system next determines if what is received is a user selection. If it is not, then the process ends. If the command is determined to be a user selection, then it, as in the previous case, is processed.

If script is inserted externally by a host, the user may either send the script to determine if it is user selected, or forward the inserted script to be processed.

User commands are also solicited and received by the "Presentation Engine." Such commands may include, for example, "click Record" to display, "click Record content" to insert, or another action. An example of a user command may include clicking on a formatted Record (e.g., Jane Doe) to display Record-Associated Attributes (e.g., Jane Doe's Phone Number, Address, etc.).

The path of input data to be processed of the "Processing Engine," including the system process for deciding when input data is or is not processed, will be discussed.

In an embodiment, commands and data inputs can be entered to the Processing Engine from any of several sources. Library status data can be received or extension status received from User Management, or status data received from the Content Editing and Reading pages.

When library status data is received, the user has a choice whether to activate a library. If the user chooses not to activate the library, the Processing Engine is not engaged and the process ends. If the library is activated, the user makes a next decision whether to install an extension. When an extension status is received, the user then also takes a decision whether to install an extension. If the user decides not to install or alter an extension, the Processing Engine is not activated, and the process ends.

If data in the form of a status from the Content Editing and Reading pages is received, or the user decides to install extension data (as just discussed), the user decides whether there is Editing/Reading content to be processed. If no further processing is needed, then the process ends, and the Processing Engine is not engaged. If further processing is needed after this step, the Processing Engine is initiated.

The Processing Engine phase is comprised of a number of functions, generally, Content Code Reference, Record Identification, Code Correlation, and Attribute Data Return.

Formatted Records that appeared within the user's Content Reading or Editing fields indicate a match to user-library Records, and invite the user to use the Processing Engine to recall, display, edit, and incorporate alterations to Record-associated data Attributes, such as text, links, files, pictures, and the like, by clicking on the Record data that appears within the Reading or Editing content.

This invention uniquely integrates the Processing Engine with the Account Management and the Presentation Engine, to ultimately manifest content changes and renderings within the Content Editing and Reading pages. This is a continuing and recursive process, as content changes over time.

This process invites the user to recall and display detailed summaries (comprised of associated common Record Attributes) when clicked. As a result, this method and apparatus establishes a continual search and recall processing that improves the functionality of the computational machinery using it. The Processing Engine cross correlates multiple Records, within the user-activated library(ies), that simultaneously manifest within Content Editing or Reading pages.

Upon activating the library (i.e., create, subscribe, edit) with the server or access device, the interactive system receives structured data from a user-populated (manually created or added) library and makes available, via display or other integrations, user-customized content into the contextual content with which the user is interacting within the visible user interface. This solution overcomes the need for customized code for library information, as the data from the library (structured accordingly) integrates into the code for system functionality.

A point of inventive uniqueness is the way the Processing Engine facilitates Content-Code Integration and enhances the capability of the server and/or access device. The Processing Engine receives structured data from user-populated libraries (manually created or added from another source) and user-customized content integrated into generic processing code. The Processing Engine establishes a unique solution in which users may create and deploy the full functionality of Record Recognition and Associated Attribute-Display Technologies, against select and countless data sets, without the need to manipulate software code. This system improves frequency and depth of real-time data search, supplying the user superior data matches while using an access device and improved correlation of data resulting in depth of data connections via multiple data sources.

In a "Content Code Reference" phase, the interactive library system receives an "initiate Command" from the Processing Engine function. This command may be issued programmatically through a plugin or add-on, or may be user initiated. In so doing, this command directs the system to refer operational and generic code to user-specific content, thereby establishing the system's functionality as it applies to custom content, without the need to manipulate or modify source code. Finally, the integrated code is submitted to the Record identification function. The oriented code executes Record Identification functionality against user-customized libraries and execution features by directing code integration to user-defined inputs, for further action as is consistent with the description above.

The Record Identification phase of the Processing Engine notes text (or other content) and recognition features compare exact or near Record identifiers (text or other digital signature) matches between Records within user-activated libraries (from the user's Library Portfolio) and text or other digital signatures which emerge within user-activated (via mouse or cursor click) Content Editing or Reading fields.

In a first step of an embodiment, integrated code from the Processing Engine function is received.

Next, an active query is made between the library data and Editing and Reading Content pages as it exists or is created.

The system next determines whether there is a data match between the library data and Reading and Editing Content data, applying user profile-defined match specificity (i.e., whether there is an exact or approximate match). If there is not a content match, then the system continues the active query in a recursive manner.

If there is a Record-content match, the match is submitted to the "Match Records Presentation" function, which moves to apply formatting to the match, the formatting becoming visible within the user Content Editing or Reading pane of the access device.

The system then determines if there is a match with only the current single Record match or a multiple Record-Content match. This is determined by counting the number of system-determined matches between the content Records displayed in the active Content Editing or Reading field and the user's collective libraries within his or her active library portfolio.

If multiple Records (i.e., the current Record match and at least one other previous Record match) are identified, the system issues a command for cross correlation and the multiple match Records and locations are submitted for cross-correlation analysis. During this process the system will seek to identify any instances in which the multiple Records share a common Attribute. Any common Attributes between the Records are identified and the user will be presented with an annotation about the correlation to view if the user chooses.

If a single, and not multiple matches, is found and there is not a multiple Record-content match, the Record match and location is submitted to the Attribute Return function, whereupon the results of the non-multiple match are presented to the user.

This invention's Record Identification features differ from others, which similarly include tags and utilize associated database information to access database content—*Automated Creation and Delivery of Database Content* (Bookman, Mark, et. al)—in that this invention applies active query and recall against Content Editing and Reading fields without the need to actively search for associated content.

This invention's Record Identification features also differ from other data systems in that this system does not use categories for search—rather, this invention is a flat file structure without hierarchical groupings through which search is automated against pre-defined Records. Furthermore, this invention does not have a "search method." Instead, Record Identification is conducted in the back end automatically, with no user intervention, utilizing an active read/type query method. This invention also allows a user the ability to access multiple libraries for simultaneous operability, utilizing a monolithic data structure, and the system's configuration is applied to automatically render links within the user's Content Editing/Reading field. This broadens and deepens the data search, correlation, and reporting capabilities of the server and/or access device, increasing the utility of any involved device to the user.

Record Identification occurs loosely within the "Process Text" and "Recognize/Format Records" phases. This is accomplished by executing integrated code, which references custom user input that is obtained via the user's library portfolio, for active query against the user's Content Reading and Content Editing panes. A query code directs a signature comparison of active content within the Editing and/or Reading panes to all Records within the user's activated library portfolio. Upon recognizing a match (near or approximate, based upon likeness of text or digital signature per user preferences), the system submits both affirmation to the attributable return function as well as to the presentation function, as well as multiple Record matches to the cross-correlation function. The uniqueness here is built upon continuous querying (as opposed to user manual search) and its application to user customized content (as opposed to more limited comparisons and resulting presentations that are only applied against discrete topical areas).

In further explanation of the Cross-Correlation aspect of the system, the invention identifies and explores Record-Record relationships when two or more Records from user-assigned libraries are coupled. The existence and derived content of Cross Correlations between library Records feeds the Presentation Engine for display within the Content Editing or Reading pages, and appears upon the server and/or access device.

The Processing Engine, in the Cross-Correlation phase, administers this invention's Cross-Correlation function to identify and explore Record-Record relationships when two or more Records from user-assigned libraries are coupled. In one embodiment, coupling occurs when multiple Records that exist within the users Library Portfolio appear and have common Record-Associated Attributes within a single Content Editing or Reading field. The existence and derived content of Cross Correlations feeds the Presentation Engine for display on the Content Editing or Reading field. Cross Correlation may occur as applicable Records emerge, or upon user command.

In a first step, Multiple Match and locations are received from the Record Identification function. The system then determines whether there is a correlation match of the Attributes, meaning whether the multiple Records share a common Attribute association. If there, is no correlation match, then the result is returned as null. If there is a correlation match, either a correlation match is—depending on what further action is required—submitted to an Attribute Return function, or a correlation match and location is submitted to the Presentation function.

This interactive library system's Cross-Correlation features are unique in that this invention does not only return raw information but further automatically executes Cross-Correlation analysis without user action. In this way, correlations are consistently sought, identified, and presented without user intervention—thereby expanding the processing demand on the physical system to similarly expand the system and device capability and user utility.

Cross-Correlation processing is programmed to occur across libraries automatically, by identifying Records with common associations. Specifically, the system will identify the occurrence of multiple Records within the user's active Content Page, then will correlate all Attributes amongst said Records to look for common associations (e.g., common place of employment, alumni, etc.).

Focusing on the features of the "Attribute Return" phase, if a match is received from Record Identification, or a common Attribute match is received from the Cross-Correlation function, the system seeks matching associated Record Attributes. Upon one or more text matches between the Record Content Editing/Reading pages and a library's text or digital signature (from either the Record Identification or Cross-Correlation portions), then the associated Attributes with matches are submitted to the Presentation Engine. This portion of the Processing Engine will retrieve associated Record Attributes, and feed the Presentation Engine the matching results. If there are no matching associated Record Attributes, the system returns a null search result, ending the process.

It is noted that this system's Attribute Return function differs from other systems in that the system herein works with text within a web age and/or native application. This system's focus is on taking in the meta-data of the text, comparing that with the invention's database, and providing relevant input to the user to influence the content of the document. Further, this system returns all associated elements within a common library.

Focusing on Presentation Engine in greater detail, after match data is processed by the Processing Engine, the Presentation Engine formats the data matches and presents the matching data as text matching one or more library data back to the Content Editing and Reading phase. The Presentation Engine includes the overall functions of Record Formatting, Correlation Formatting, and Attribute Display.

As a user works on a document or the like with the access device, a presentation-icon command appears in the content, and if the user chooses to, the user can copy and insert Attributes into the Content Editing field by clicking on the applicable presentation-icon command. The Presentation Engine (and associated sub-functions) administers presentation of data in Content Editing or Reading fields as pop-up data and commands in the content via a web or desktop interface. Presentation serves as the primary basis for system-user interaction.

The Presentation Engine also indicates relationships between numerous Records within the Content Editor or Reader field if they exist. These relationships are determined via the Processing Engine, which cross correlates multiple Records within the user-activated library(ies) that simultaneously appear within a Content Editing or Reading page. Similarly, such relationship appearances invite the user to recall and display detailed summaries (comprised of associated Record Attributes) when clicked. As a result, this method and apparatus establishes continual search and recall processing to improve the functionality of existing computational machinery.

Focusing on the Presentation Engine in greater detail, the Presentation Engine processes Record-formatting data, correlation-match data, and/or Attribute information.

Within the Content Editing Reading fields, Records are identified in accordance with preferences defined within the Library Management phase. Record formatting is administered and managed in accordance with preferences defined by a user within Library Management and against matches identified within the Record Identification component of the interactive library system's Processing Engine. For example, Record formatting could include the emergence of a select-colored underline applied to a Record recognized to have related or associated library content. Record formatting may occur as applicable Records emerge, or upon user command.

In an embodiment, library formatting data from the Library Management phase, a Record match and location from the Record Identification phase, active field data from the Content Editing and Reading phase, or any combination of these, are forwarded. The received data or combination of data is processed to match the Record formats as Record Identification presentation script. This Record Identification presentation script is submitted back to the Content Editing and Reading phase.

Similar to Process Library Formatting, the Correlation Formatting data from the User Management phase, a correlation match and location from the Record Identification phase, the active field data from the Content Editing and Reading phase, or any combination thereof, are forwarded. The received data or combination of data is processed to match the Correlation Formatting script as Correlation Presentation script. This Correlation Presentation script is submitted back to the Content Editing and Reading phase.

Similar to Record Formatting, the Presentation Engine also administers Correlation Formatting as herein, in accordance with preferences defined within User Management, and against correlations identified within the Correlation Identification component of this invention's Processing Engine. An example of Correlation Formatting may include the emergence of a select-colored background format applied to the correlated Records. Correlation Formatting may occur as applicable Records emerge, or upon user command.

Likewise, similar to Process Library Formatting of Figure and respective Correlation Formatting is the processing of Attribute Display. User command displays Attributes from the Content Editing and Reading phase, a Record location match and location from the Record Identification phase, associated Attribute data from the Attribute Return phase, or any combination thereof, are forwarded. The received data or combination of data is processed to Attribute Display script. This Attribute Display script is submitted back to the Content Editing and Reading phase.

Upon receiving Record-Associated Attributes for recognized content or correlations from the Processing Engine, the interactive system presents returned Attributes within a structured display (e.g., a table) when the user renders a positive command within the User Command function (e.g., the user clicks upon formatted content). The table or other structured display disappears upon another positive user command (e.g., a second user clicks upon the formatted content).

The Presentation Engine receives Record-Associated Attributes for recognized content or correlations from the Processing Engine. These Attributes present within a structured display (e.g., a table) upon positive command rendered by the user within the User Command function (e.g., user clicks upon formatted content). The table disappears upon another positive user command (e.g., second user clicks upon formatted content). This invention's Attribute Display feature herein is unique in that the present system returns structured tables and the like, with the ability to include text that links to other data, such as hyperlinked files.

The Interactive Library system herein further provides an unbound user experience to browse and share libraries housing any form of content. Unlike systems of multiple databases, which are fixed and role-specific, this invention is a dynamic set of structures within an overarching database. The inventive system herein is not bound by a set, functionally-organized database structure, but provides a flexible system, with users afforded the ability to build any data set (i.e., library) within the overarching data sets.

In real time, the data search, analysis, and reporting capabilities of the server and/or active device are greatly enhanced, resulting in users being fed deeper, more relevant information in real-time, so that each can improve their performance and do their jobs better. The system proactively presents information to a user, saving the user from having to actively search and confirm information, also saving time. With this system, each device and by extension each user, cannot only create a library, but herein has the flexibility to create the library most relevant to a user's particular position and needs, to create or select information for retrieval most useful to them, maximizing effectiveness of data use. This further provides the benefits of helping provide consistent and informed communications, using known and trusted data sources. The immediacy and context of data presentation in real-time also help a user understand, in real-time, the relevance of data.

Herein disclosed is a method and apparatus to facilitate user creation and integration of custom data libraries into content recognition and data attribute retrieval processes and facilitating software.

BRIEF DESCRIPTION OF THE DRAWINGS

FIG. 1A is a schematic diagram illustrating the overall process of an embodiment of the invention from a user perspective.

FIG. 2A is a schematic diagram focusing on an overall portion of installation and use of the invention.

FIG. 2C is a schematic diagram focusing on an overall portion of installation and use of the invention.

FIG. 2D is a schematic diagram focusing on an overall portion of installation and use of the invention.

FIG. 3C is a schematic diagram of an embodiment of a user interface illustrating a part of the invention in use.

FIG. 4B is a schematic diagram breaking out and showing more specific steps of a portion of the embodiment of FIG. 4A.

FIG. 4D is a schematic diagram breaking out and showing more specific steps of a portion of the embodiment of FIG. 4A.

FIG. 4E is a diagram illustrating an embodiment of a user interface during the steps shown in FIG. 4B.

FIG. 4G is a schematic diagram breaking out and showing further detail of a portion of the embodiment of FIG. 4A.

FIG. 4I is a schematic diagram breaking out and showing more specific steps of a portion of the embodiment of FIG. 4A.

FIG. 4K is a schematic diagram breaking out and showing more specific steps of a portion of the embodiment of FIG. 4A.

FIG. 4L is a schematic diagram breaking out and showing more specific steps of a portion of the embodiment of FIG. 4A.

FIG. 4M is a schematic diagram breaking out and showing more specific steps of a portion of the embodiment of FIG. 4A.

FIG. 4Q is a schematic diagram breaking out and showing more specific steps of a portion of the embodiment of FIG. 4A.

FIG. 4R is a schematic diagram breaking out and showing more specific steps of a portion of the embodiment of FIG. 4A.

FIG. 4S is a schematic diagram breaking out and showing more specific steps of a portion of the embodiment of FIG. 4A.

FIG. 4T is a schematic diagram breaking out and showing more specific steps of a portion of the embodiment of FIG. 4A.

FIG. 4U is a schematic diagram breaking out and showing more specific steps of a portion of the embodiment of FIG. 4A.

DETAILED DESCRIPTION OF PREFERRED EMBODIMENTS

Figure 1B:
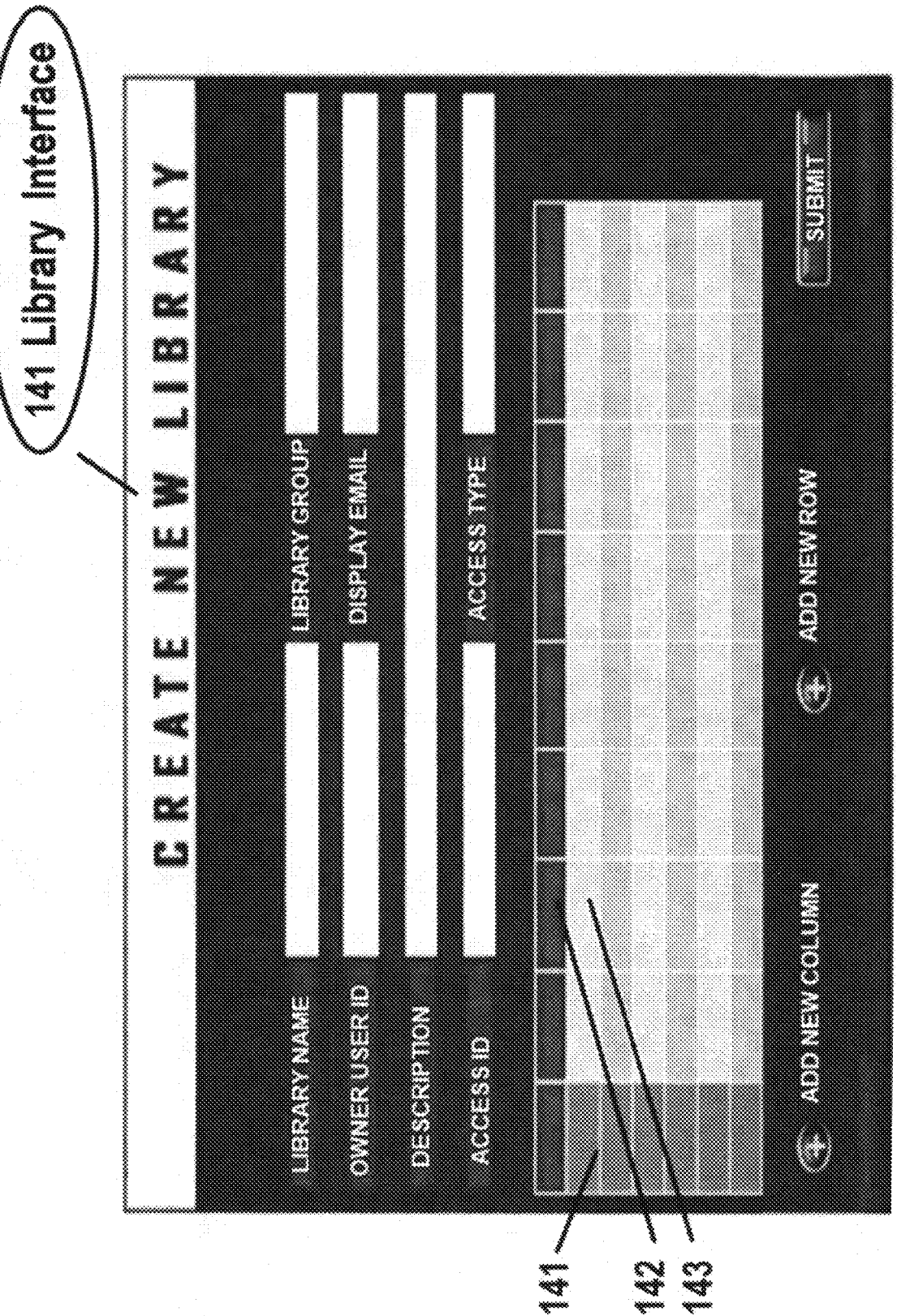
FIG. 1B is a schematic of an aspect of the process illustrating some invention terminology.

Other objects, features, and advantages of the invention will become apparent from a consideration of the following detailed description and the accompanying drawings. The following descriptions are made referring to the figures, wherein like reference numbers refer to like features throughout this description. Not all numbers appearing in one figure are necessarily present in another.

For purposes of this application, applicant wishes to define these terms as follows:

Account: User interface to manage the invention's functionality.

Administration: User interface for an administrator or administrative entity to manage the user experience.

Algorithm: A mathematical formula applied to one or more data sets.

Application: The software mechanism through which the invention is created and manifests itself.

Attribute: Data that is associated with a Record. An Attribute is used to describe or provide further sub-information about a Record.

Auto-query: The process of continually processing emerging content to search for library Record matches.

Computer: Any electronic device that allows for computer processing, such as, but not limited to, a PC, laptop computer, tablet, and smartphone.

Content Search: The comparison of whole or partial digital content to library Records.

Content Recognition: The affirmative match or machine-recognized near-match resulting from Content Search. A near match can be, for example, misspellings of a name or inverted letters. The system can be pre-programmed to provide system recognition of such near-matches when a set of letters is not a recognized word, and suggest a matching word. E.g. "gerg" can be recognized by the system as not a word, but similar to, and suggest "greg" as a "match."

Desktop Application: Software that can execute commands and may reside within a closed system and does not require access to the Internet.

E-mail: Electronic mail, comprised of one or more messages distributed electronically.

E-publishing: A system which disseminates publications in an electronic format.

External Source: Hosts that are external to the invention.

Library: A compilation of Records comprised at least in part of their associated Attributes and Settings, typically in a grouping of common subject matter (e.g., employees, customers, etc.)

Library Portfolio: A compilation of user-activated libraries.

Record: A content subject, against which content recognition will be applied. A Record is a component of a library.

Social Media: Any form of digital communications providing, at the least, a platform for users to post and read messages.

Software: Code which drives and controls computer processing and user interface.

Value: A form of an Attribute (data associated with a Record)
  d. Original Value is a type of value that is manually entered into a table by a user.
  e. Feeder Value is a type of value that is automatically acquired from another data source, such as an external database or website.

Derivative Value is a value type that is based upon functions applied to one or more Original or Feeder values.

Web Application: Software that may reside in an open system, be hosted online, and require access to the internet.

Any other terms not listed herein are to be defined and as typically defined and used by those of ordinary skill in the art of digital software creation and development.

Herein disclosed is an interactive user library system and method of interactive creation and customization. The interactive user library system can facilitate user creation and integration of custom data libraries into content recognition and data attribute retrieval software. This invention serves to increase available data, data relationships, and recall queries to enhance computer processing, along with the user's digital communication experience.

The invention is a method and apparatus, incorporating a software application, to enhance the current functionality of devices, servers, and processors by increasing the volume and frequency of search-and-return queries, employing topically-unlimited and user-defined-or-created content libraries to enhance digital communications within any form of Content Editing and Reading fields, such as editing or reading documents, social media posts, web pages, or spreadsheets. The invention's utility is enhanced through its incorporation into a typical configuration of Account Management, Content Editing/Reading pages, a Processing Engine, and a Presentation Engine.

Through this invention, users may create and populate content libraries, manually or via another data source such as an external database. Users also may accept or modify existing libraries. The library will integrate into the system to facilitate real-time search of the library, as a document, spreadsheet, or the like is being worked on, of any form of active Content Editing/Reading fields for Records from the library (or portfolio of libraries) and return Record-Associated Attributes of any suitable format.

Turning first to FIG. 1A, an embodiment of the interactive user library system 10 is shown and featured in use, FIGS. 1A-3D illustrating the system 10 from a user-experience orientation. The interactive library system 10 is comprised generally of at least one electronic device with user interface, such as a server, PC, laptop, tablet, or smart phone. The system 10 can either be placed on a central server 12 or other electronic device, and accessed from the server 12 by an access electronic device 14, as shown in this embodiment, or placed on and accessed by the same electronic device.

In either case, the system 10 enhances the capabilities of the server 12 and or access device 14 by making either device capable of finding and providing information about data connected to Records of which a user may not otherwise be aware.

The system 10 further comprises, generally, a User Registration and Software Download/Access phase (generally shown in steps 20-40), a Library Administration phase (generally shown in steps 50-90), Text Processing and Library Interface phase (generally shown in steps 100-120), and a Presentation Execution phase (generally shown in step 130).

Figure 4A:
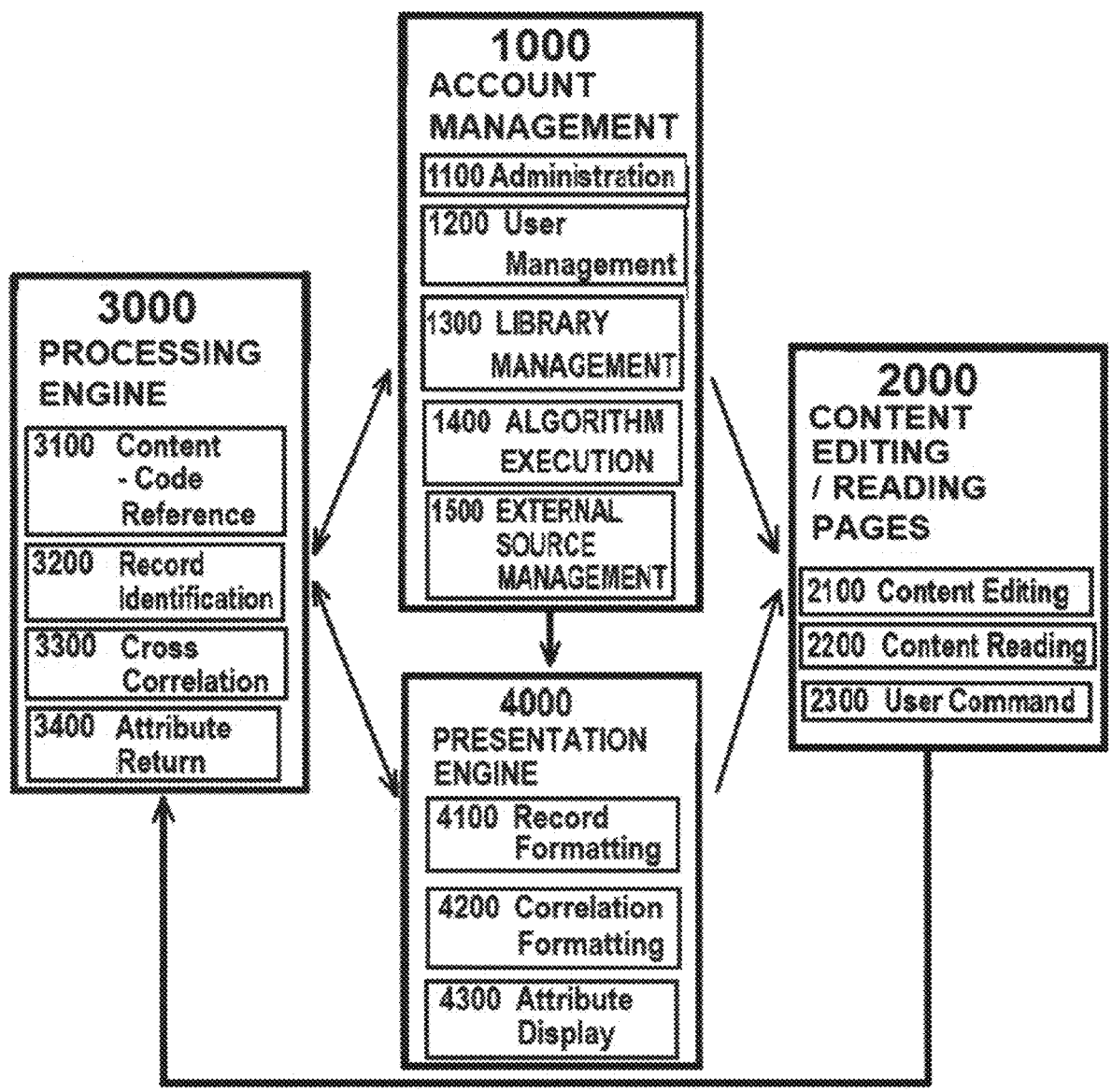
FIG. 4A is a schematic diagram illustrating the overall steps of an embodiment of the process of the invention in action.

In comparison to upcoming FIG. 4A, the Account Management phase 1000-1500 therein is generally represented in the steps 20-50 of FIG. 1A, the Content Reading/Editing phase 2000-2300 is generally represented in steps 50-90, the Processing Engine phase 3000-3400 is generally represented in steps 100-130, and the Presentation Engine phase 4000-4300 is generally represented in step 130.

In an initial User Registration/Login step 20, a user on an access device 14 accesses a server 12, or directly accesses the interactive library system 10 from their own device, and is typically first provided with a registration interface, and completes a registration through steps typical of a registration to download software or join a platform, including providing information such as an email, ID or password, and possibly accepting terms or a licensing agreement. If a user is already registered, the user may be asked to login or automatically log in by the system 10.

The next step is determined by whether the user login and/or registration is successful, as indicated by a "Success?" decision node A.

If the user is unsuccessful, then access is denied 40 and the user can either quit or repeat the registration/login step 20. If the user is successful at registration/login 20, then the user proceeds to download and install any extension software 30 of the interactive user library system 10, or other items required for the system, or any such items are automatically loaded upon successful completion of registration/login 20.

Turning briefly to FIG. 2A, an installation interface 151 on the access device 14, to install the system extension 30, if it is not already installed, is shown in use. In one embodiment, the extension can be installed via browsing software 150. Software (e.g., a CRX file) is installed, an extension is selected, and the software is dropped into the extension. In another sample embodiment, the software can be downloaded from an app store instead of the "drag and drop" procedure.

Figure 3A:
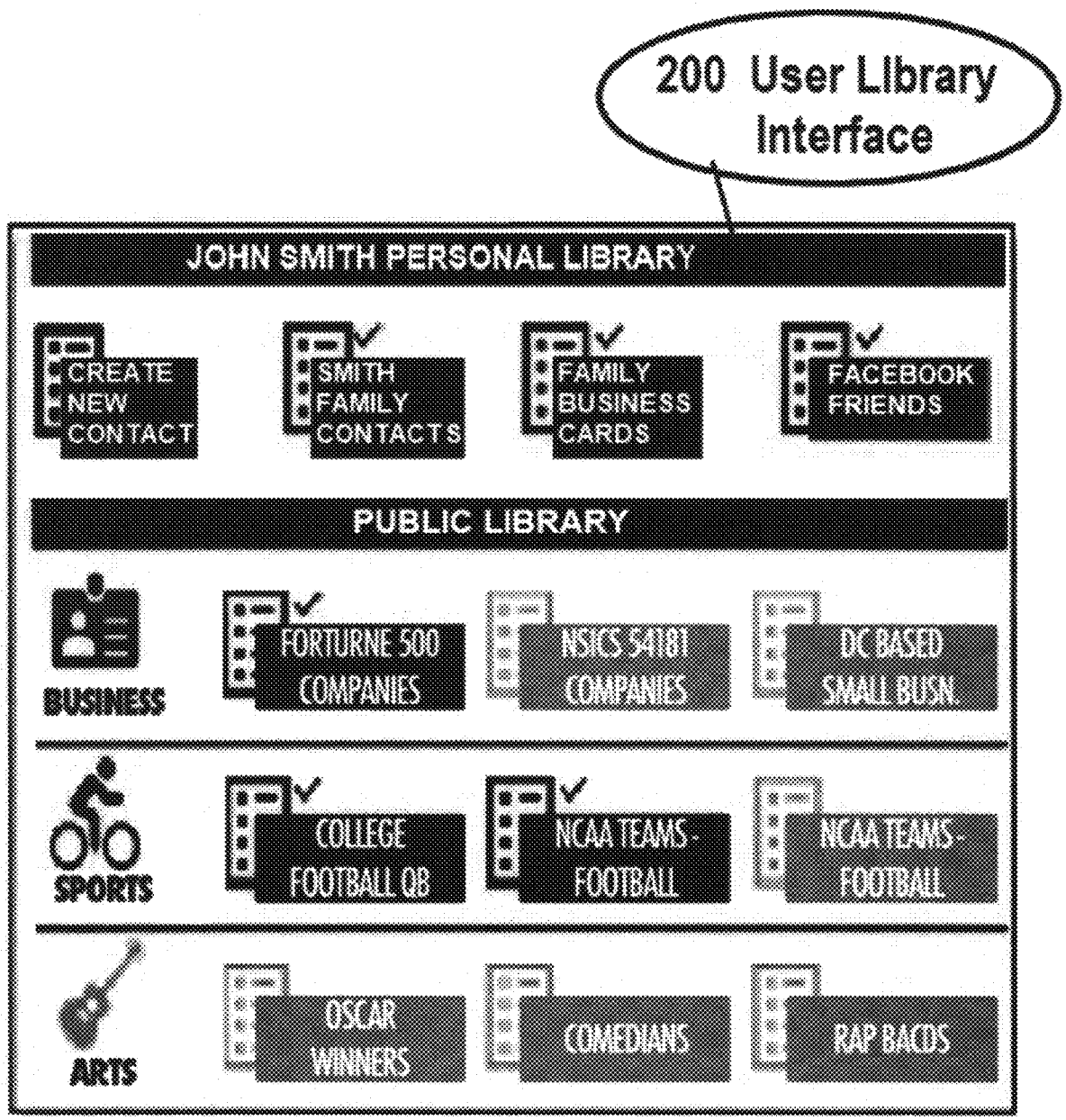
FIG. 3A is a schematic diagram of an embodiment of a user interface illustrating a part of the invention in use.

Returning to FIG. 1A, after any required software is installed 30, the user is shown, and can view, any pre-made or pre-created libraries 50. A listing of libraries, or types of libraries, will appear on a user access device 14 screen. The user may browse libraries by a direct search function, by category, by alphabetical order, or by other suitable categorization and listing method. When a user becomes interested in a library, the user can choose to see more complete detail about that library. The user can then proceed with that library or return to their browser and choose another one. Turning briefly to FIG. 3A, a user library interface 200 of a sample library selection is shown. Upon the interface 200, both private and public libraries, along with an option to create additional libraries, are shown, as well as an option to "Create Library."

Upon review of available libraries, the user can decide whether to apply an available library (or set of libraries), as indicated by "Apply?" decision node B.

If a user decide "no" to applying a library for use, the system 10 then provides an option to create a personalized library, as indicated by step Create Libraries 60.

Turning briefly to FIG. 1B, a sample embodiment of a "Create New Library" interface 141 is shown, displaying a chosen library. For clarity, further definition of several terms appearing in the library interface 141 will be discussed in greater detail. A first column is a Records column 142 with a set of individual Records. Records are members of an individual library or library family. For example, if the library is a library of company employees, then the employee name "Greg" is a sample of what might be a Record within the library.

Following the Record column(s) 142 is a subsidiary Attribute row 143. Attributes are the field(s) used to provide further elaboration of the Records of the Record column 142 within the library interface 141. As an example, the sample Record "Greg" may have Attribute row(s) labeling further information about "Greg" (e.g., Address, Phone, Birthday).

Values column(s) 144 appear beneath the Attribute row(s) 143 and provide the specific value(s) or form(s) of each Attribute. For example, if "Greg" is the Record in the employee library, and "phone number" and "address" are Attributes of the Record "Greg," the values of these, for example, could be "555-2233" or "227 W. Poplar Street."

Figure 3B:
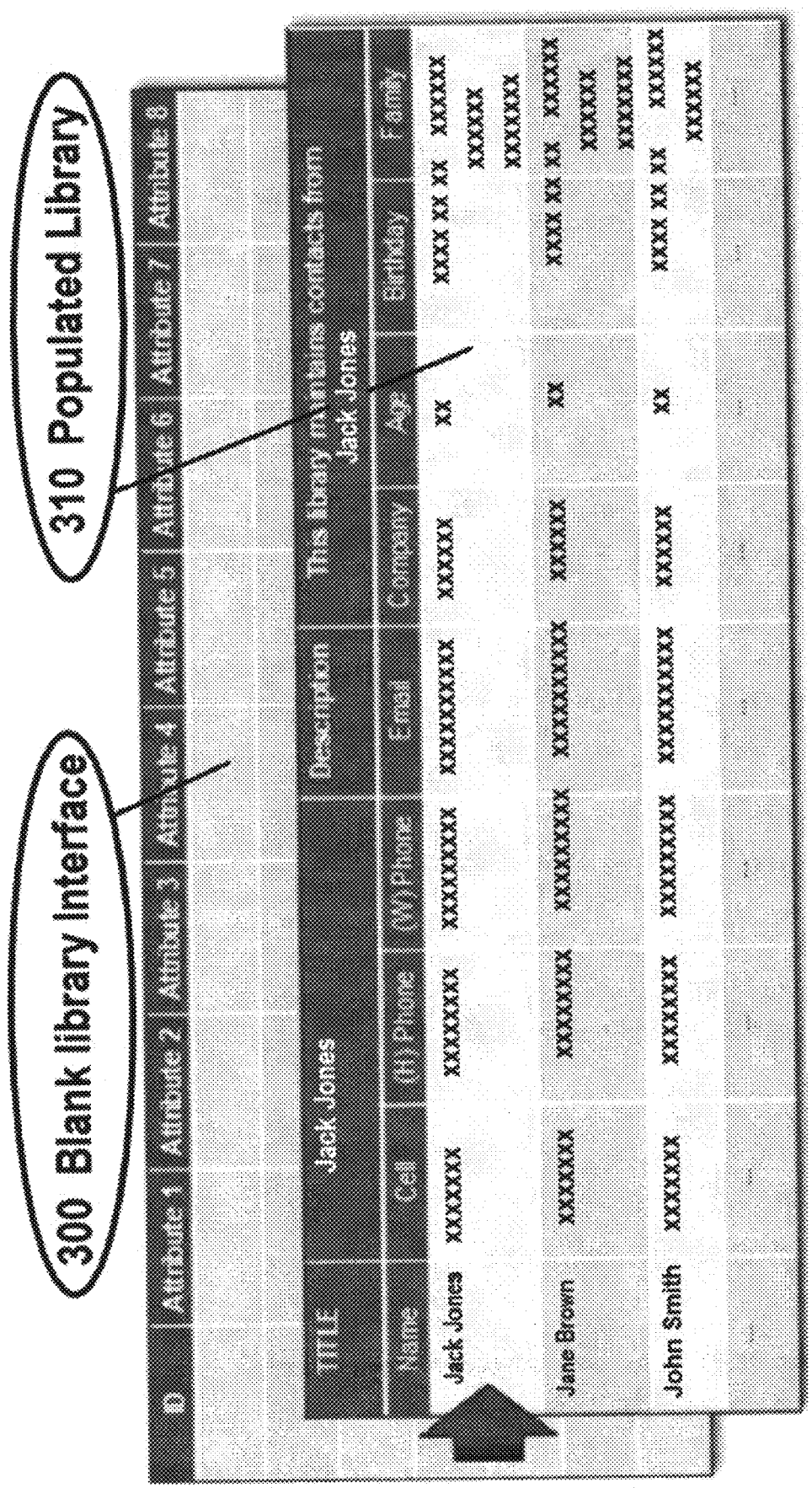
FIG. 3B is a schematic diagram of an embodiment of a user interface illustrating a part of the invention in use.

Turning quickly to FIG. 3B, an example of a populated library interface 310, with populated Record column and subsidiary value rows, is shown. The library in this embodiment appears as a reference table of information in a first column, as several types of Records are listed, while in a second column, examples of associated Attributes of Records are listed, which further define that Record with assigned values are shown. For example, the Record shown in the left column is "Personal Contact Names" while in the right Attributes column list is information about this name (e.g., Contact Phone Number, Address, Age, etc.). Also shown, just behind the populated interface 310 is the previously unpopulated library 300 from which the populated library 310 is created.

As previously mentioned, there are several types of Attribute values, depending on how they are acquired. If a value is manually entered into the table by a user, it is an "Original Value." If a value is automatically acquired or added from another data source such as a website or external database, it is a "Feeder Value." If a value is arrived at based upon a function or functions being applied to one or more Original or Feeder Values, it is a "Derivative Value."

Returning also to FIGS. 1A-1B, at the Create Libraries step 60, a user, instead of needing to rely upon a pre-set library of limited utility, can create a customized library or libraries of their own. Herein, the term "library" should be taken to mean library or libraries. When the interface 141 for the interactive library 10 appears, the user can populate the Record 142 and Attribute 143 fields with suitable values. This can be done, as referred to, by directly imputing the values, by downloading value data from an external source, or through a pre-set function. If the user chooses to download value data from an external source, the user assigns a feeder or feeders and what values will be attained from the feeder or feeders, and can create or assign algorithms for any function to be used.

After the user creates a custom library 60, the library is added to the system 10. The user can choose to re-use a library 80 in the system (including the newly-created library), create another library, or proceed to Manage Libraries 90. At the "Manage Libraries" step, the user can work with a library or libraries by doing such things as ordering, arranging, acquiring, assigning, or deleting formats.

Figure 2B:
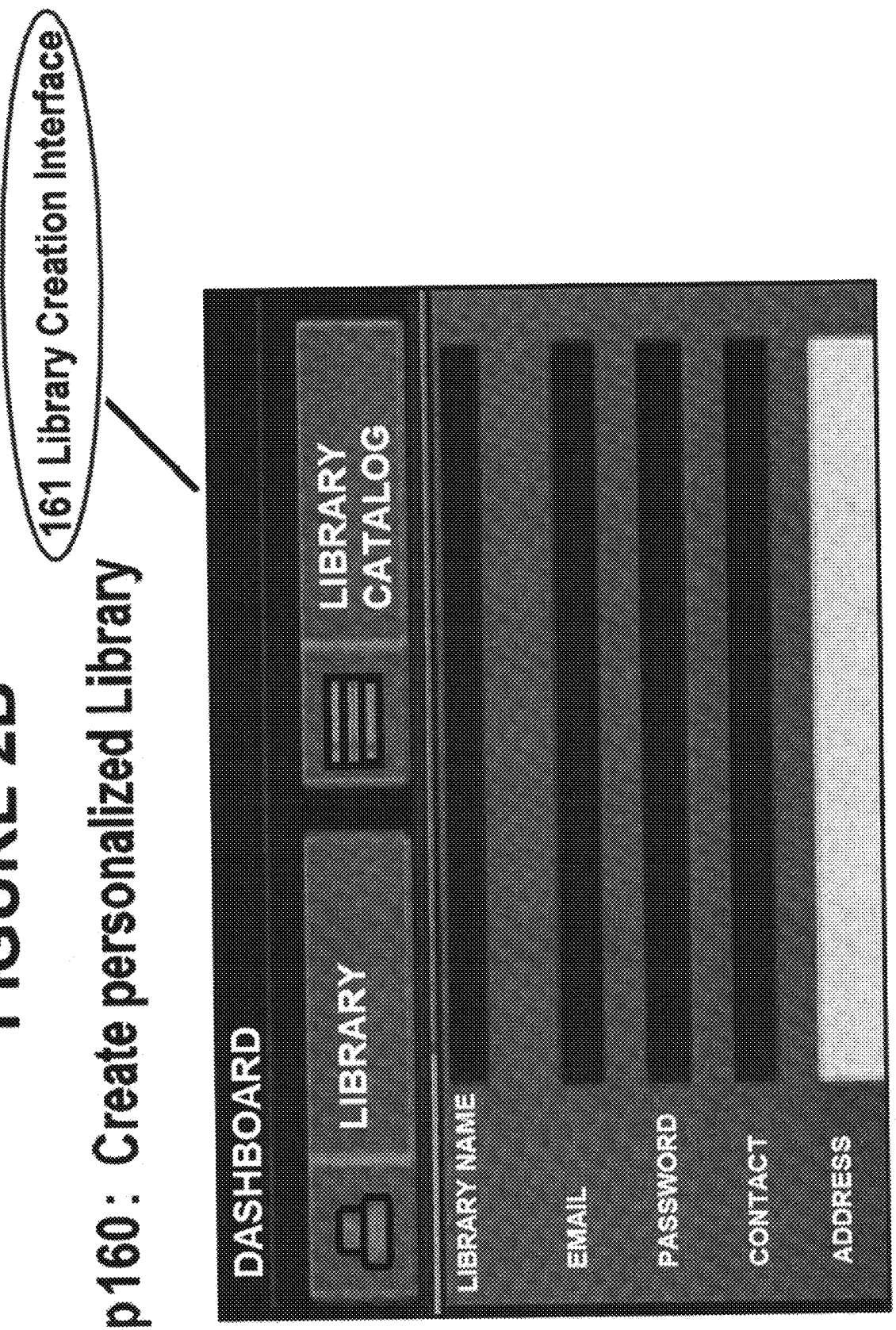
FIG. 2B is a schematic diagram focusing on an overall portion of installation and use of the invention.

Turning briefly also to FIG. 2B-2C, a library creation interface 161 and library activation interface 181 as the library is, respectively, installed and then activated by the user as part of library creation 60 are shown in use.

Looking at FIG. 2B, in an embodiment, the user can, to create a library, log into an admin page, create a library file by supplying information such as name, email, and a password to the library, and add Records and associated fields to the Records. Looking briefly to FIG. 2C, in an embodiment, to activate the library 180, the user can log into the library by any accepted means in the art, such as clicking on an icon or using title and password.

Figure 3C:
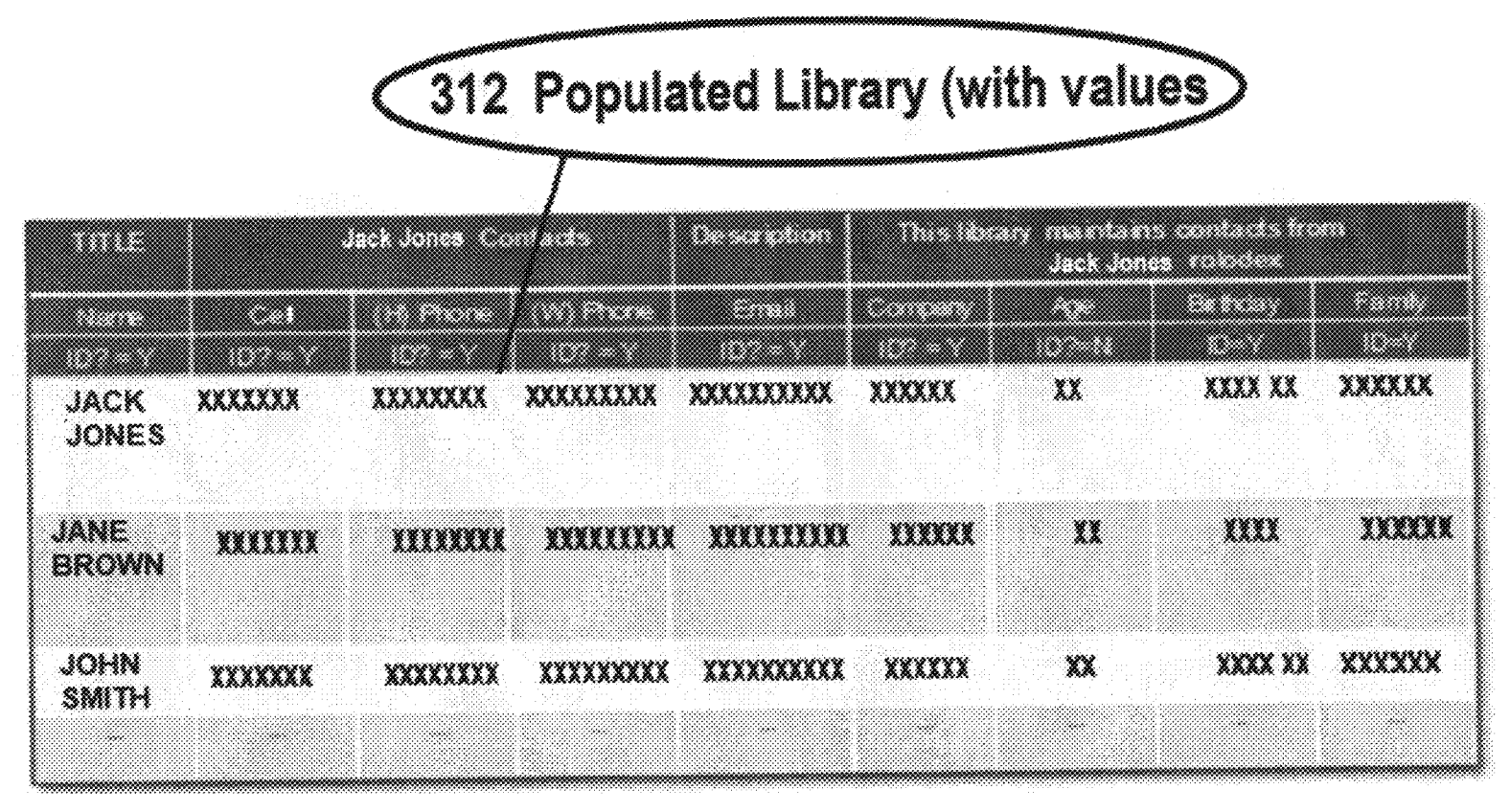

Turning briefly to FIG. 3C, a populated library interface structured library 312, showing meta-data, algorithms, and functions, which can be altered to generate new function-related resulting Records and Attribute values, is featured.

Moving back to the "Apply?" decision node B, if the user decides to apply a pre-existing library or set of libraries, the system 10 then provides the user an option to edit the applied library or libraries, as depicted by "Edit?" node C.

If the user decides to "Edit" the library, the user advances to an editing interface, as indicated by the "Edit Libraries" step 70. The user can access and make any chosen alterations to an existing, even newly-created, library, including adjusting Attributes and values. The user can do this, or can access an external source capable of automatically adjusting the Attributes and values. The user can also copy the existing library into a personal portfolio. Accordingly, the user may alter or adjust a library that is used more universally to personal preference. For example, the user can access a library of a company's employee directory, copy it into a personal portfolio, and make personal notes or value adjustments without affecting or having them show in the company library.

If, upon reviewing an existing library, a user chooses not to edit, or further edit, a library, the user can accept the accessed library and apply the library for re-use, as depicted in step 80.

Once the user processes the library in accordance with any or a combination of the steps 60-80, the user is presented with an interface to manage any libraries 90. In this step, the user can handle other details related to the library, such as inviting other users to the library, customizing the library, and prioritizing return of duplicate Records from different libraries (so that a common Record that exists within multiple libraries will present alternatives for the user to select, in order of the library's order).

Upon signifying completion of any desired Library Management tasks, the interactive system 10 provides the user an interface to process text 100.

As a user performs functions, such as reading, editing, or otherwise working on a document or website text, the user's text of the document, website, or other task is processed by continuously comparing it to the library text to determine if there are any matches.

The continuous comparison can include comparison for near-matches as well as matches, and near-matches (as discussed in the definition of the term "match" herein) brought to the attention of the user as well in a further embodiment, comparative algorithms can be used, and be refined or added to in a programmed or self-teaching manner, to bring near matches and even similar terms that might have the same or similar meaning to that searched, to a user's attention.

When a match to the library is found, the system 10 matches the task text, in a "Recognize/Format Records" step 110, to a specific active library Record. The matching portion of the task text is re-formatted to signal the match (e.g., by underlining the text in a user-selected color, such as red).

Once a text match is signaled, the user can decide, as signified by "Select?" node D, whether to select the re-formatted text and learn about the matching data.

If the user decides not to learn about the matching library data, the process moves to the end step 140 and terminates. The user may continue with the document, or if finished with the document, end use of the interactive library system 10.

If the user decides to examine the matching library data, the user can request that the interactive system 10 supply Attribute information about the matching Record with return values 120. The user can click, scroll over, or otherwise act, initiating display of all the associated values information to the user.

Turning to FIG. 2D, an execution interface 191 in one embodiment for executing functionality 190 for the user to return values 120 to identify and view Record match details and their Attributes are shown. In one embodiment, the user can click on a system-formatted word or an icon to see the associated information for a system-recognized Record.

Figure 3D:
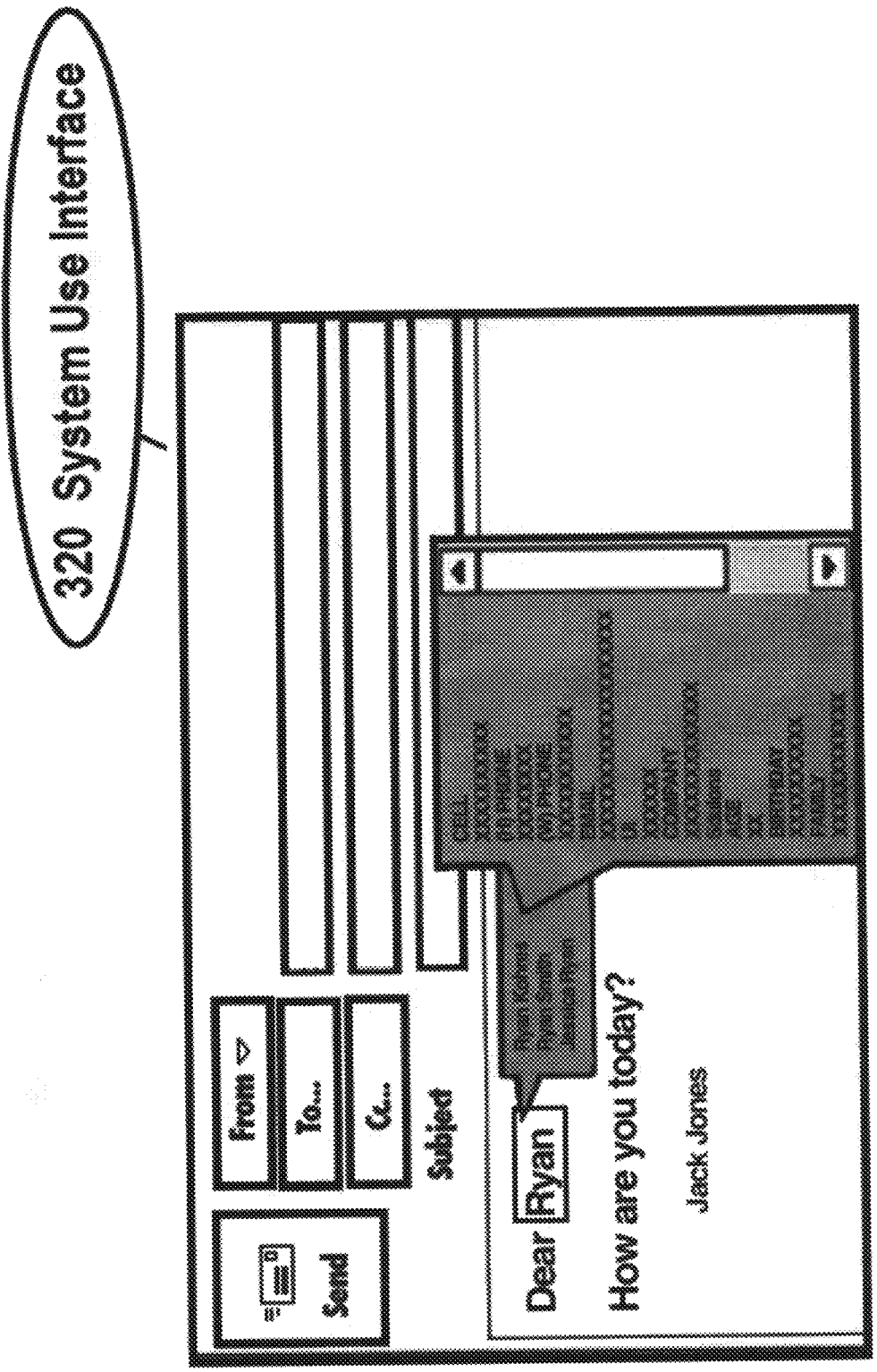
FIG. 3D is a schematic diagram of an embodiment of a user interface illustrating a part of the invention in use.

Turning briefly also to FIG. 3D, a system-use interface 320, featuring a sample of displayed Records by a user, is shown. In this sample, a user is composing an email on a computing device such as a computer, phone, tablet, or the like. Typing the Record "Ryan" has resulted in a match, which (through pre-chosen formatting) has resulted in is the Record "Ryan" being highlighted. The user has chosen to learn more about this match, and has clicked on the Record or taken another suitable step. Upon command, Attributes associated with this Record populate a portion of the screen, so that the user has more real-time information about "Ryan." As the access device 14 would not otherwise have this capability, the capability of the access device 14 to the user, the capability of the server 12 to increase that capability, and the users knowledge, are increased.

Moving to the next decision node, Action? Node E, the user can decide whether to simply review the additional data from the library or act to incorporate the data into the task text. If the user decides not to take further action, the process again moves to the End step 140 and terminates. If the user decides to execute action 130, the value data, such as Attribute title and value, or a portion thereof, are added to the text for the user to review. Similarly, the Attribute values may be added with a contact card profile or other suitable method as known in the art.

In a brief example, an organization may define a library by feeding content from its HR database into one. When a user is authoring an email to an employee, the system 10 will automatically search the library in real-time as the email is being drafted. The system 10 will recognize any Record and provide associated Attributes for any same or similar terms in the email by first formatting the matched Record for the user's attention. The Record, or an icon leading to the Record, may appear on the email screen at the term that matches. The user can then ignore the information or can command (e.g., via clicking on the formatted name appearing on the screen) the system 10 to display associated Attributes from the library.

For example, an employee name may result in a match in the library; the user is given a notification that the name, such as Jane Doe (i.e. Record), has a library match and is then given the option of providing further information (i.e., Attributes), such as Contact Information, Salary, Family Information, or Performance Scores, for Jane Doe. Additional features allow the user to insert any desired retrieved content into the Content Editing fields of what they are working upon, share libraries of information, or even cross correlate content between multiple libraries to identify instances where more than one Record on the active Content Editing/Reading pane share a common Attribute from user-activated libraries within his or her library portfolio.

Example of an Embodiment in Use

Returning to FIG. 1A, John (a User) registers into an account, or creates one for himself 20, by completing responses to required fields, and is granted access to a pre-created site or database "A". Within John's account, he may edit his registration profile content, if he chooses to.

John's library or libraries appear in a portfolio view, and within John's Library Portfolio view, he also observes existing libraries within the Public Library Portfolio, which the author(s) marked as public and available to all users 50. Such libraries can include, as a few examples, politicians, local business leaders, college quarterbacks, clients, and any other suitable subject area of interest. He also can observe libraries that are not public but that have been created by others who have chosen to grant him access. Such a library might include his Family Contacts and his firm's internal Human Resources Database.

John decides whether to apply one or more of these libraries at the "Apply?" decision node B. In a first example, John is preparing for his Fantasy Football league, so he edits his Fantasy Football library 70, and additionally moves the college Quarterbacks library, an existing library, from Public to his Private portfolio to assist.

John also struggles to remember his extended family members' information such as occupation, spouse, etc., so he accepts and uses a Family Contact library that was shared with him 80.

Later, John as a manager seeks to supply his employees with relevant and useful training. As such, John creates a Training Course library 60 with Learning Areas (e.g., Communication Skills, Writing Skills, etc.) serving as Records, and available courses serving as Record Attributes.

Then, since John is new to his organization, he has accepted and accesses the HR Library for re-use to better understand his workforce 80.

With these libraries activated and the software installed, John's Content Editing and Reading tools (e.g., web browser, desktop apps, etc.) are now actively querying content, searching for Record matches to the libraries he assigned as he works on a file such as a document.

John is reviewing his Fantasy Football team's lineup online. John is reviewing his team's quarterback, "Sam Jones," which is also a Record within the College Quarterbacks library John created (by acceptance) within his Private portfolio 60. The text "Sam Jones" is processed 100 and is recognized as a match to a library Record and formatted to appear on the website with the additional processed formatting of a green underline (a green underline which the user has set within his library preferences to appear) 110 to indicate that the software recognizes a Content-to-Record match from John's College Football Quarterbacks library. At "select?" decision node D, John chooses to see more information about "Sam Jones," clicks on the formatted "Sam Jones," and is presented with a returned table which includes various Attributes of the Record "Sam Jones," such as team, passing yards, and rushing yards 120. After reviewing the library information in real-time because it appeared before him, John realizes that Sam Jones does not have the rushing yards John requires, and elects to drop Sam Jones from his team. In this instance he has no need to execute action 130 or add any of the additional information about Sam Jones.

Then, John is typing a note to refer his brother Steve, a Real Estate agent, to his friend Joe: "Dear Joe, I'd like to introduce you to my brother, Steve." Since "Steve" is a Record within John's pre-created Family Contacts library, the word "Steve" formatted (in blue underline as pre-set by John in his library preferences) indicates that the software recognizes a Content-to-Record match from his Family Contacts library. John clicks on the formatted Record "Steve" and is presented with a table to include various "Steve" Attributes, such as his phone number, email, address, and favorite team. John clicks on the Attribute for Steve's phone number, which the system 10 automatically inserts into the note at the point of his cursor within his email. Additionally, with this information, John adds a personal touch to the note saying, "Wish Steve luck when the Redskins, his favorite team, get to beat the Cowboys." (Hopefully, there's an Attribute telling John that Joe isn't a Cowboys fan.)

John is at work writing a performance appraisal for Tom, one of his employees. In doing so, John types into the web-based firm performance tool comments for Tom: "Tom should work on his Communication Skills." Since "Communication Skills" is a Record within his Training Course library, the words "Communication Skills" format (in purple underline as set by John's library preferences) to indicate that the software recognizes a Content-to-Record match from his Training Courses library. John clicks on the formatted "Communication Skills" and is presented with a table to include various Attributes, such as available courses that are intended to develop this Learning Area. Leveraging this information in real-time, John tailors a more actionable appraisal to say, "Sally should take Communicating for Managers 104 to improve her communication skills." This has enhanced the performance of John's computer and his document application.

Later that day, John, new to his organization, struggles to understand why his peers, Dave and Jane, tend to side with each other during organizational disputes. Normally, his computing device or its application would be little or no help to John in understanding this issue, which could be important to his future within the organization. In reading a note sent by Dave with references to Jane, both names highlight consistently (red background as set by his User Management preferences) to indicate a Cross-Correlation Match from the two names from the HR Library within his Portfolio Library. John clicks the Match indicator and is presented with a summary of the cross-correlated match—stating that Dave and Jane have common matches in College, Graduation Year, and Major. John now realizes that the two went to school together and probably spent lots of time together, studying the same major. With this information, John realized why the two routinely side with each other, and with the added benefit of this knowledge, he can start to assess how to manage this relationship.

Turning to FIGS. 4A-4U, the interactive library system 10 is shown from a more operational perspective.

Turning to FIG. 4A, the Account Management phase 1000 is shown in further detail. In the Account Management phase 1000, a user can use the access device 14 to manage any of multiple account aspects, such as share a library or libraries and manage library preferences. This can be done internally or externally via suitable ways, such as accessing the internet with the access device 14 or desktop application with interface on the access device 14, and these functions can be done by a user and/or administrator.

In a preferred embodiment, a user can manage and access their personal accounts from the access device 14 to include and alter personal information and libraries, and Account Management Administrators may manage user access and communications within the system 10 from the server 12 or access device 14. The user-activated library or libraries serve as the collection of data against which the computer will analyze, search, correlate, and return results as a user is reviewing or working on a document, spreadsheet, or the like. Account Management 1000 (and its associated sub-functions) operates consistent with controlled and customizable web and desktop applications, such as email, social media, document drafting, and other suitable functions.

The associated sub-functions of Account Management 1000, overall, comprises a collection that includes: Administration Management 1100, User Management, 1200, Library Management 1300, Algorithm Execution 1400, and External Source Management 1500.

It is to be understood that throughout, a number of these features of the interactive library system 10 and steps underlying them, do not operate in isolation but are interactive with other features, with labeled "steps" sometimes being taken back and forth between phases of the system 10.

Staying with FIG. 4A and turning additionally to FIG. 4B, if a user wants to manage account details or information, the user typically enters an Administration Management 1100 phase. Upon entering, the user logs into or enters the system 10. In this embodiment, the user enters a Welcome Page interface 1102 and the user (manifesting as an administrator) enters login credentials. If the system 10 accepts the user's ID/password 1102A, the user proceeds to an access controlled site 1104. From the controlled access area, through which administrators and/or the users have the rights and privileges, the administrator and/or user, via the server 12 and/or access device 14, can observe and manage (e.g., delete, deactivate, etc.) user accounts and/or a library or libraries. Additionally, Administrators may manage interface communications, including but not limited to, content postings (e.g., Privacy Policy, Terms of Use, Tutorial Media) and web text (e.g., welcome message to suitable parts of the system).

From here, the user or administrator is offered the options of customizing library content, communicating with the system users, or managing user account(s).

If the user wants to customize a library(ies), the user can access a library list 1106 interface and view the library 1108. The library system 10 presents the user library options 1108B, from which a user can either create a new library or edit a current library.

If the user wants to access content communication features, the user can proceed to access customized communications interface 1104, view communication options 1116, and from there, customize communications 1118 to user preferences.

Figure 4C:
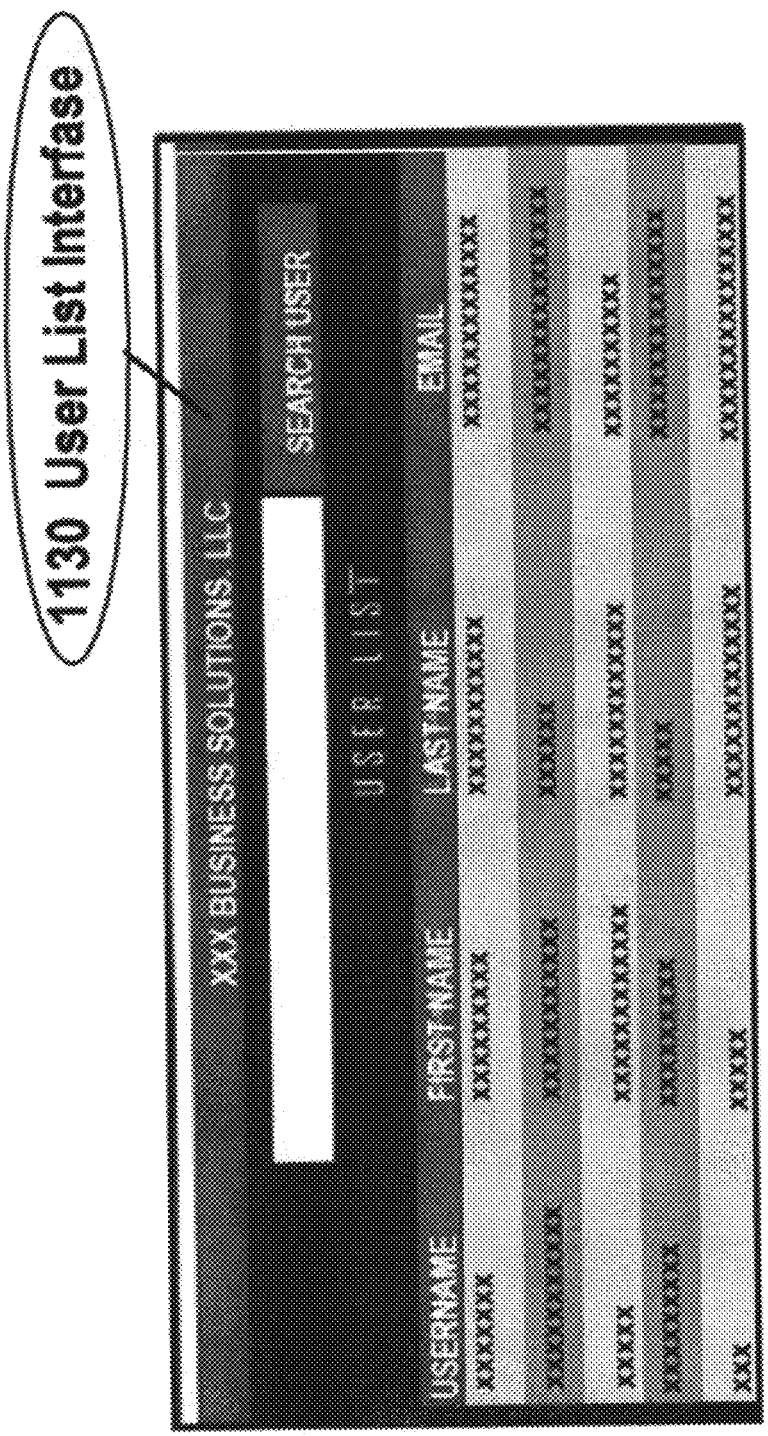
FIG. 4C is a diagram illustrating an embodiment of a user interface during the steps shown in FIG. 4B.

If a user wants to manage a user account(s), the user can choose to access the user list 1120 and view details of a user or users 1122. Similar to the library list, the user has a user option 1122C, and can choose whether to delete a user file 1124 or edit the user 1126. Turning quickly to FIG. 4C, a sample interface, in this case a user list interface 1130, is shown. The interface shows a set of user names and Attribute features, which can be edited or even deleted.

Turning to FIG. 4D, the User Management phase 1200 provides a user account features to edit their user profile. The User Management phase 1200 is based upon individual access controls established by the user, through which the user can access, create, manage, or delete their account. The user accesses this phase by engaging a user Welcome Page interface 1202 and any established login 1202A. If the login is accepted, the user proceeds to a controlled user site 1204. The user can access their profile 1206 from here, or proceed to access a library page 1210 to obtain further user information. After the user has accessed the user profile 1206, the user is provided an option to edit, delete, or save the user profile 1208.

If the user creates an account profile, this profile may include or be provided appropriate information (e.g., age, gender, password), solicitation, entry, and registration (which may include associated meta-data such as the date created). Account Management includes viewing preferences, analytics/correlation preferences, and profile revisions. Account Login serves as the control mechanism by which individuals can access their personal account only upon rendering the appropriate authorization credentials (such as Login ID and Password), which the user decides and enters into the system 10.

Turning quickly to FIG. 4E, a Registration Interface 1220 of user information is shown, with such information as name, email, and address shown in the fields, which can be edited as needed.

Figure 4F:
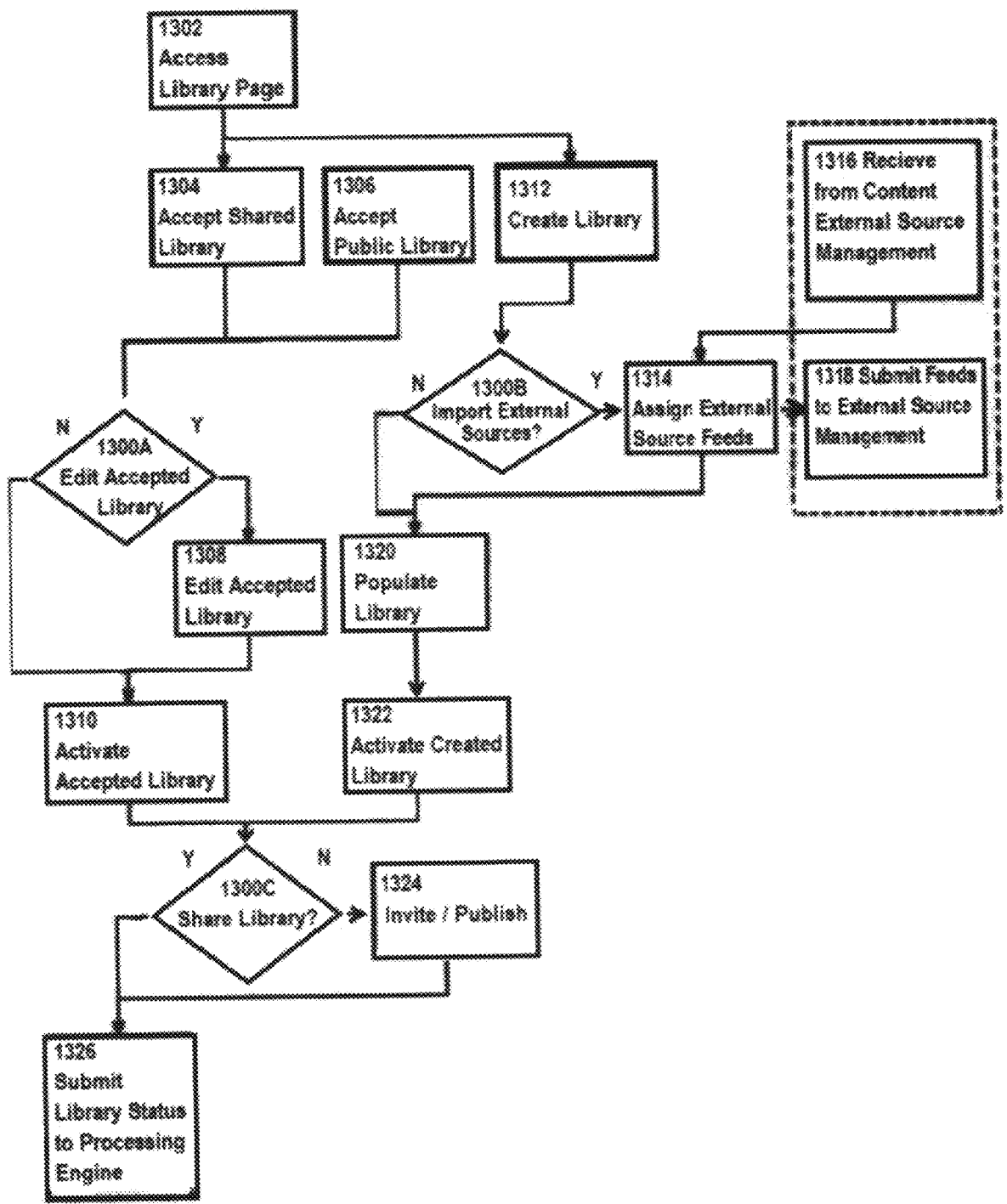
FIG. 4F is a schematic diagram breaking out and showing more specific steps of a portion of the embodiment of FIG. 4A.

Turning to FIG. 4F, in the Library Management phase 1300, a mechanism is provided through which the user is able to create a new library, modify a library (e.g., content, presentation settings, or algorithms), accept a public or shared library, or edit a library. Each library includes content for Records and associated Attributes (of various working document formats, such as text, JPEG, Word, and the like) captured via common categories. Such content manifests predominantly as text but may include digital signatures associated with image, video, or other formats.

The user enters the Library Management phase 1300 via a library access page 1302. Among items the user can review are the library description, algorithms, and content. After entering the library page interface 1302, the user can accept a public or shared library 1304, 1306, or create a library 1312. Acceptance of a library enables the user to efficiently replicate an authorized library(ies) that was not created by the user, within the user's personal Library Portfolio to enhance access to information and corresponding scope in its functionality.

By choosing to accept an internal, shared, or public library 1304, 1306, the user then has a library present within the user's Library Portfolio. The user then has a choice whether to edit the library 1304A. If the user chooses to edit the library 1308, the user can update Records, Attributes or other features of the library. Library Editing allows the user to modify content (e.g., add, remove, change), algorithms, and settings (e.g., presentation colors, order) for created or accepted libraries within the user's Library Portfolio.

Whether the user chooses to edit the library 1388 or proceed without editing, the accepted library is activated 1310. The user can then decide whether to share the library 1310A. If the user decides to share the library, it can be published 1324 for others to access. The library is then submitted to a Processing Engine 1326 for processing its functionality within the user Content Editing or Reading pages 2100-2200.

If a user chooses to create a library rather than share it, the user enters an interface to create a library 1312. The user can decide whether to create a library, or import a library or partial library, from an external source 1312A. If the user decides to obtain a library from an external source, the user can choose a source for the library by assigning external source feeds 1314. The user can receive content from an external source management 1316. The user can also submit source feeds to an external source for management tasks 1318.

Whether an internal library is used or an external library source is imported, the library is populated with Records and related data 1320. Library Creation may also include the assignment of select algorithms to apply against one or more data fields, to render a distinct and derivative Record Attribute. This feature will be discussed later in greater detail. Upon creating a library, the user can then activate it 1322 and move on to decide, as is the case with a shared or public library, whether to share the library 1310A, Sharing/publication of a library facilitates communication and controlled distribution to others via email, posting to a site, or other digital communication channel. In this embodiment, Library Creation includes both manual and ingested Record and Attribute data, with which the user populates fields of Records and associated Attributes.

Figure 4H:
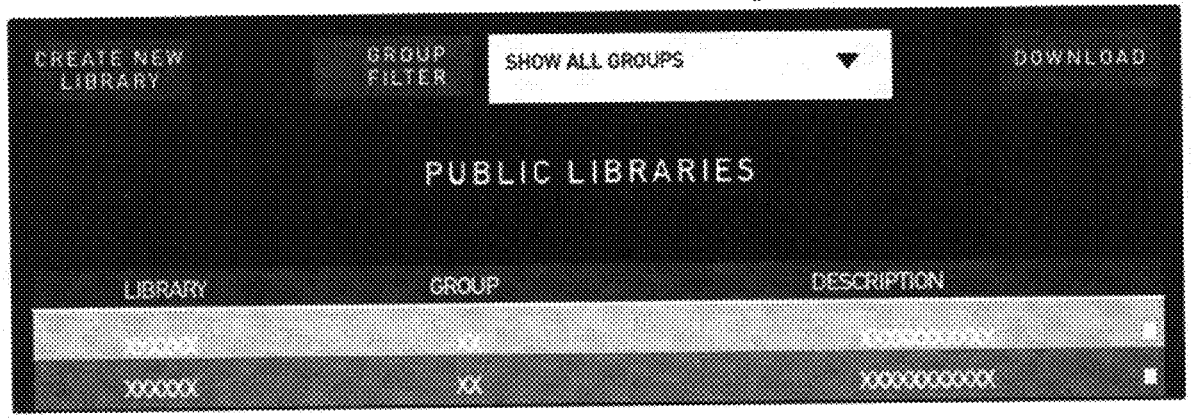
FIG. 4H is a diagram illustrating an embodiment of a user interface during the steps shown in FIG. 4B.

Turning quickly to FIG. 4G, a sample of populated Record and Attribute fields is shown. In a first example on the first line, a "Personal Contact Name" is a Record, and Exemplary Record Attributes include a phone number, address, and age for the person whose name is in the Record column. Turning to FIG. 4H, an interface for a library, in this case a public library interface 1330, is shown, including labeled Record type fields and Records and Attributes that can be populated and changed.

This invention's Library Management features differ from others in the sense that users do not have to manually assign associations within a content editor. Rather, associations are actively and continuously searched as digital content emerges within the Content Reading or Editing field and compared against Records within the user's Library Portfolio.

This invention's Library Management features further differ from others which work with fixed content and a fixed central database. Part of the uniqueness and utility of this solution lies within the combined limitless association of Records to Attributes (captured within Libraries) and codeless integration of such data into Content Recognition and Retrieval Technologies. This invention's Library Management features differ from others in the important respect that this invention does not rely on cumbersome categories for search, but rather displays exact data matches to Records, terms, numbers, words, and the like, based on user Record Identification.

Turning to FIG. 4I, the Algorithm Execution phase 1400 is shown in further detail. An update and/or change of a library is received 1402 from the User Management phase 1200 or Library Management phase 1300, as the user enters the Algorithm Execution phase 100C. Upon submitting a library, created or edited, the user either does or does not assign an algorithm 1402A, depending upon changes made or not made to the library. If an algorithm is not assigned, then it is not executed 1408, ending this stage of the process.

The user can elect to apply a created or provided analytic function to generate further information from library date. For example, if employee "John Smith" is a recognized Record from library, in addition to returning the associated Attributes for "John Smith" such as Start Date, Seniority Level, Salary, or the like, it could return derived value(s) generated at that time by application of analytic function (algorithm) (e.g., John=#3 of all company employees for tenure, John=#8 of 10 for all company employees at the grade of Sr. Associate).

If an algorithm is assigned by the user, it will be executed 1404, applied to one or more library fields, and derivative Record data will be returned. The Algorithm Execution feature 1404 processes user-assigned formulas to derive new and distinct Attributes (from one or more Record-Associated Attributes) of the library. The executed algorithm then responds to the Library Management function 1406, such that the resulting, derivative Attribute(s) will be consistently applied, along with original Attributes within this invention's Presentation Feature.

Figure 4J:
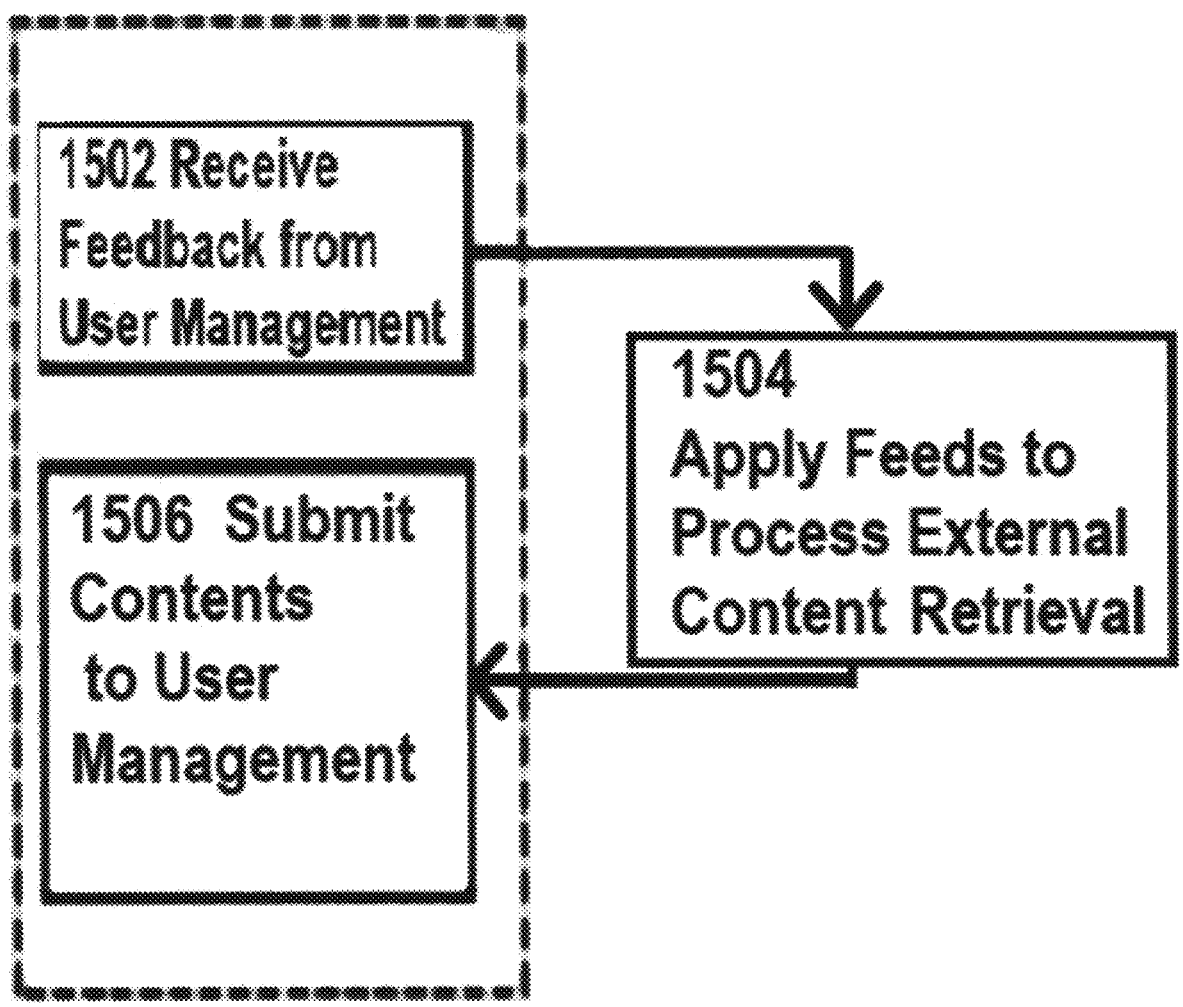
FIG. 4J is a schematic diagram breaking out and showing more specific steps of a portion of the embodiment of FIG. 4A.

Turning to FIG. 4J, and additionally back to FIG. 4F, the External Source Management phase 1500, as referenced in FIG. 4F, 1316-1318, is shown. When a feed is received from the User Management phase 1200, to an external source 1502 (See FIG. 4F, 1318), the feed is applied to a process of external content retrieval 1504. In this embodiment, a user can assign an external data source (See FIG. 4F, 1314) to populate a library by either (a) submitting login credentials to commonly-utilized data sources, or (b) assigning one or more data feeds from one or more external data sources. The Library Management phase 1300 serves as the primary means by which content interchange with an external source(s) is established and maintained. This interchange can be established via engineered data feeds for links to unique external sources, such as, e.g., an internal Human Resource system, or access-driven data feeds which apply pre-engineered configurations to common sources such as, e.g., Facebook™ or LinkedIn™, that are accessible via user login credentials.

The external content is submitted 1506 back to the User Management phase 1200 to help update any chosen library(ies) (See FIG. 4F, 1316).

This invention's External Source Management phase 1500 differs from other prior art configurations that require a user to search for terms or content, locate additional resources for a term, constantly map external databases, or schedule regular merges of data for synchronization, and in which a user's device is limited to these capabilities. Here, the feeding technology, and by extension the server 12 and access device 14, are not bound to a specific function derived database or databases, so that the system herein enhances the capability and searching power of these devices.

Returning briefly to FIG. 4A, when the steps of the User Management phase 1000 are complete, the user may then, depending upon circumstances, move to the steps of the Content Editing and Reading phase 2000, or if the library Record and Attributes are updated, directly to the Presentation Engine 4000.

Turning to FIG. 4K and also remaining with FIG. 4A, the Record or Attribute data is read and edited as needed via the Content Editing and Reading pages 2100-2200. In a first step, formatted Presentation script is received from one of multiple sources. Content Editing and Reading fields may exist in various formats and serve as display and interact fields, in which this invention's Presentation Features operate. Content Editing fields are those in which users type digital content, and Content Reading fields are those in which users read or observe digital content. Common forms of Content Editing/Reading fields include, for example, Desktop Applications (e.g., MS Word) and Web Applications and Sites (e.g., email and Facebook™). Content commonly manifests as text but may also include digital signatures associated with image, video, and other formats. A user can copy and insert Attributes into the Content-Editing field by clicking on the applicable presentation-icon command. In addition to Record formats, the Presentation Feature also indicates relationships between numerous Records within the Content Editor or Reader field if they exist.

In this embodiment, formatted identification Presentation script is received from the Record formatting function 2102, or formatted Correlation Presentation script is received from a Correlation function 2104 after a Record formatting is complete. In either case, the system 10 forwards the Record Identification and/or Correlation Presentation script(s) for processing 2106.

Turning to FIG. 4L, as well as continuing view of FIG. 4A, a User Command phase 2300 is shown in further detail. From within the Content Editing/Reading fields 2100-2200, a user submits commands to the system 10 for Attribute return, insertion, and the like. In the User Command phase 2300, the user may receive any of several possible scripts or commands, including an Attribute display script from the Attribute Display function 2302, user selection from a user command 2304, or host click insert script 2306.

If Attribute Display script is received 2302, then the interactive system 10 processes it to render Record-Associated Attribute Display script 2310 associated with the assigned user library. If the system 10 receives a user selection via a user command 2304, the system 10 next determines if what is received is a user selection 2304A. If it is not, then the process ends 2308. If the command is determined to be a user selection, then it, as the previous case, is processed 2310.

If script is inserted externally by a host 2306, the user may either send the script to determine if it is user selected 2304A, or forward the inserted script to be processed 2312.

As indicated by an arrow within FIG. 4A, user commands are also solicited and received by the Presentation Engine 4000. Such commands may include, for example, "click Record" to display, "click Record content" to insert, or other action. An example of a user command may include clicking on a formatted Record (i.e., Jane Doe) to display Record-Associated Attributes (e.g., Jane Doe's Phone Number, Address, etc.). Another example of a User Command may include clicking on a specific Attribute within the display to insert content into the Content Editing field (e.g., Jane's Phone Number next to her name).

Turning to FIG. 4M, and continuing with FIG. 4A, the path of input data to be processed, including the system process for deciding when input data is or is not processed, of the Processing Engine 3000, is shown.

In this embodiment, commands and data inputs can be entered to the Processing Engine 3000 from any of several sources. In this case, library status data can be received 3002 or extension status 3006 received from User Management 1200, or status data received 3010 from the Content Editing and Reading pages 2100-2200.

When library status data is received 3002, the user has a choice whether to activate a library 3002A. If the user chooses not to activate the library, the Processing Engine is not engaged and the process ends 3004. If the library is activated, the user makes a next decision whether to install an extension 3002B. When an extension status is received 3006, the user then also takes a decision whether to install an extension 3002B. If the user decides not to install or alter an extension 3002B, the Processing Engine is not activated, and the process ends 3008.

If data in the form of a status from the Content Editing and Reading pages 2100-2200 is received 3010, or as just discussed, the user decides to install extension data 3002B, the user decides whether there is Editing/Reading content to be processed 3010A. If no further processing is needed, then the process ends 3012, and the Processing Engine is not engaged. If further processing is needed after this step 3010A, the Processing Engine 3000 is initiated 3014.

The Processing Engine phase 3000 is comprised of a number of functions, generally, Content Code Reference 3100, Record Identification 3200, Code Correlation 3300, and Attribute Data Return 3400. Formatted Records that appeared within the user's Content Reading or Editing fields indicate a match to user-library Records and invite the user to use the Processing Engine 3000 to recall, display, edit, and incorporate alterations to Record-Associated Data Attributes (e.g., text, links, files, pictures, and the like) by clicking on the Record data that appears within the Reading or Editing content.

This invention uniquely integrates the Processing Engine 3000 with the Account Management 1000 and the Presentation engine 4000, to ultimately manifest content changes and renderings within the Content Editing and Reading phase 2000. This is a continuing and recursive process, as content changes over time.

This process invites the user to recall and display detailed summaries (comprised of associated common Record Attributes) when clicked. As a result, this method and apparatus establishes a continual search and recall processing that improves the functionality of the computational machinery using it. The Processing Engine 3000 cross correlates multiple Records within the user-activated library(ies) that simultaneously manifest within the Content Editing or Reading pages 2100-2200.

Upon activating the library (i.e., create, subscribe, edit) with the server 12 or access device 14, the interactive system 10 receives structured data from a user-populated (i.e., manually created or added) library and makes available, via display or other integrations, user-customized content into the contextual content with which the user is interacting within the visible user interface. This solution overcomes the need for customized code for library information, as the data from the library (structured accordingly) integrates into the code for system functionality.

In other words, a point of inventive uniqueness is the way the Processing Engine 3000 facilitates Content-Code Integration and enhances the capability of the server 12 and/or access device 14. The Processing Engine 3000 receives structured data from user-populated libraries (i.e., manually created or added from another source) and user-customized content integrated into generic processing code. The Processing Engine 3000 establishes a unique solution in which users may create and deploy the full functionality of Record Recognition and Associated Attribute Display Technologies, against select and countless data sets, without the need to manipulate software code. This system improves frequency and depth of real-time data search, supplies the user superior data matches while using an access device 12, and improves correlation of data resulting in depth of data connections via multiple data sources.

Figure 4N:
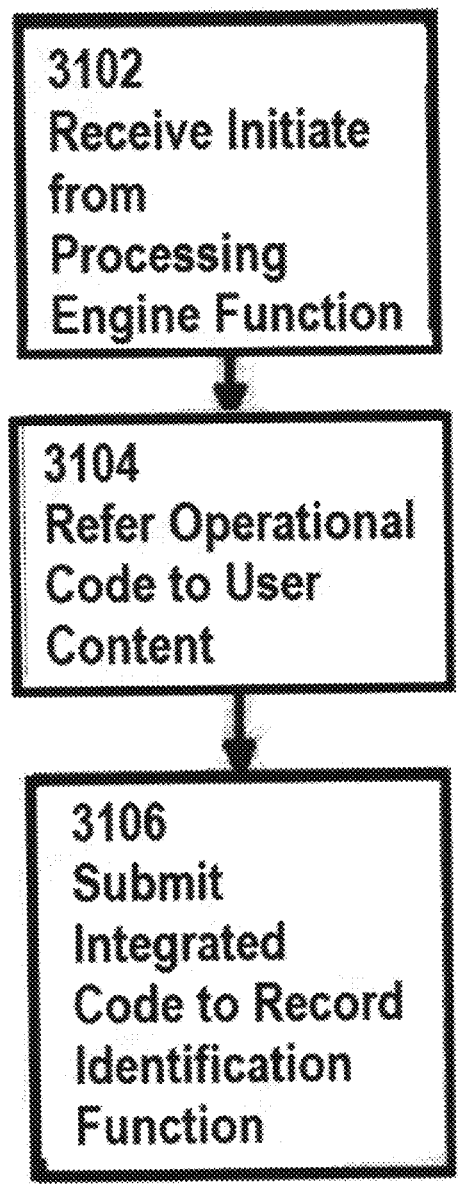
FIG. 4N is a schematic diagram breaking out and showing more specific steps of a portion of the embodiment of FIG. 4A.

Turning to FIG. 4N, and continuing view of FIG. 4A, the Content Code Reference phase 3100 is shown in further detail.

The interactive library system 10 receives an initiate command from the Processing Engine function 3102. This command may be issued programmatically through a plugin or add-on, or may be user initiated. In so doing, this command directs the system 10 to refer operational and generic code to user-specific content 3104, thereby establishing the system's functionality as it applies to custom content, without the need to manipulate or modify source code. Finally, the integrated code is submitted to the Record Identification function 3106. The oriented code executes Record identification functionality against user-customized libraries and execution features by directing code integration to user-defined inputs, for further action as is consistent with the description above.

Figure 4O:
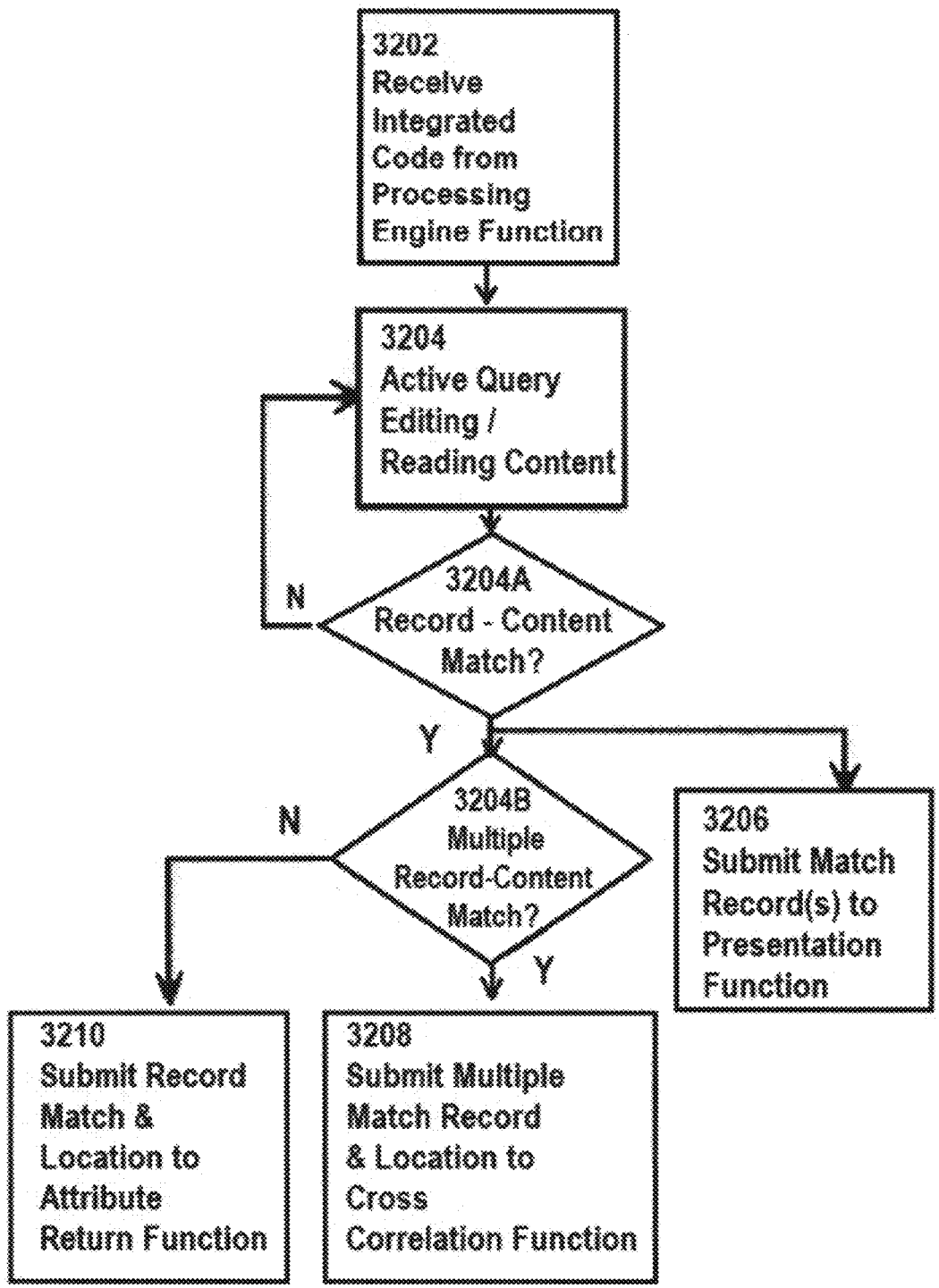
FIG. 4O is a schematic diagram breaking out and showing more specific steps of a portion of the embodiment of FIG. 4A.

Turning to FIG. 4O, the Record Identification phase 3200 of the Processing Engine 3000 is shown in further detail. The Record identification phase notes text (or other content) and recognition features, comparing exact or near Record Identifiers (text or other digital signature) matches between Records within user-activated libraries (from the user's Library Portfolio) and text or other digital signatures which emerge within user-activated (via mouse or cursor click) Content Editing or Reading fields.

In a first step of an embodiment, integrated code from the Processing Engine 3000 function is received 3202.

Next, an active query is made between the library data and Content Editing and Reading pages 2000 as it exists or is created 3204.

The system 10 next determines whether there is a data match between the library data and Reading and Editing Content data 3204A, applying user profile-defined match specificity (e.g., whether there is an exact or approximate match). If there is not a content match, then the system 10 continues the active query 3204 in a recursive manner.

If there is a Record-Content match 3204A, the match is submitted to the "Match Records Presentation" function 3206, which moves to apply formatting to the match, the formatting becoming visible within the user's Content Editing or Reading pane of the access device 14.

The system 10 then determines if there is a match with only the current single Record match or a multiple Record-Content match 3204B. This is determined by counting the number of system-determined matches between the content Records displayed in the active Content Editing or Reading field and the user's collective libraries within his or her active Library Portfolio.

If multiple Records (i.e., the current Record match and at least one other previous Record match) are identified, the system 10 issues a command for cross correlation and the multiple match Records and locations are submitted for cross-correlation analysis 3208. During this process, the system 10 will seek to identify any instances in which the multiple Records share a common Attribute. Any common Attributes between the Records are identified and the user will be presented with an annotation about the correlation to view if the user chooses.

As an example of this correlation at work, if the police are investigating a bank robbery suspect, they enter as much information as possible about their target into the system 10 and place this library within a wider investigative library. When writing a report, spreadsheet, or other case document, they enter the name of a person that seems tangentially related or may have no obvious connection but is being entered for some other reason. The system 10 finds a correlating multiple match between them in that they have access to the same bank account, or were both suspects in a previous crime. This allows the police to connect these Records in a way they otherwise might not have. This ability to cross correlate and provide annotations concerning Records with matching Attributes has a number of obvious uses, such as in law enforcement, politics, and intelligence gathering.

This invention can use these other systems as data sources and provide its unique value of continuous, passive search and cross-correlation without the need for a user to personally consult another system or set of systems.

If a single, and not multiple matches, is found, and there is not a multiple Record-Content match, the Record match and location is submitted to the Attribute Return function 3210, whereupon the results of the non-multiple match are presented to the user.

This invention's Record Identification features differ from others, which similarly include tags and utilize associated database information to access database content—*Automated Creation and Delivery of Database Content* (Bookman, Mark, et. al)—in that this invention applies active query and recall against Content Editing and Reading fields without the need to actively search for associated content.

This invention's Record Identification features also differ from other data systems in that this system does not use categories for search—rather, this invention is a flat file structure without hierarchical groupings, through which search is automated against pre-defined Records. Furthermore, this invention does not have a "search method"; instead, Record Identification is conducted in the back end automatically, with no user intervention, utilizing an active read/type query method. This invention also allows a user the ability to access multiple libraries for simultaneous operability, utilizing a monolithic data structure, and the system's configuration is applied to automatically render links within the user's Content Editing/Reading field. This broadens and deepens the data search, correlation, and reporting capabilities of the server 12 and/or access device 14, increasing the utility of any involved device to the user.

Looking also to FIG. 1A, Record Identification occurs loosely within the Process Text and Recognize/Format Records phases 100-110. This is, looking at FIG. 4O as well, accomplished by executing integrated code 3202, which references custom user input that is obtained, via the user's Library Portfolio, for active query against the user's Content Reading and Content Editing panes. A query code directs a signature comparison of active content within the Editing and/or Reading panes to all Records within the user's activated Library Portfolio 3204. Upon recognizing a match (near or approximate, based upon likeness of text or digital signature per user preferences), the system 10 submits both affirmation to the Attribute Return function 3210 as well as to the Presentation function 3206, as well as multiple Record matches to the Cross-Correlation function 3208. The uniqueness described here is built upon continuous querying (as opposed to user manual search) and its application to user customized content (as opposed to more limited comparisons and resulting presentations that are only applied against discrete topical areas).

Figure 4P:
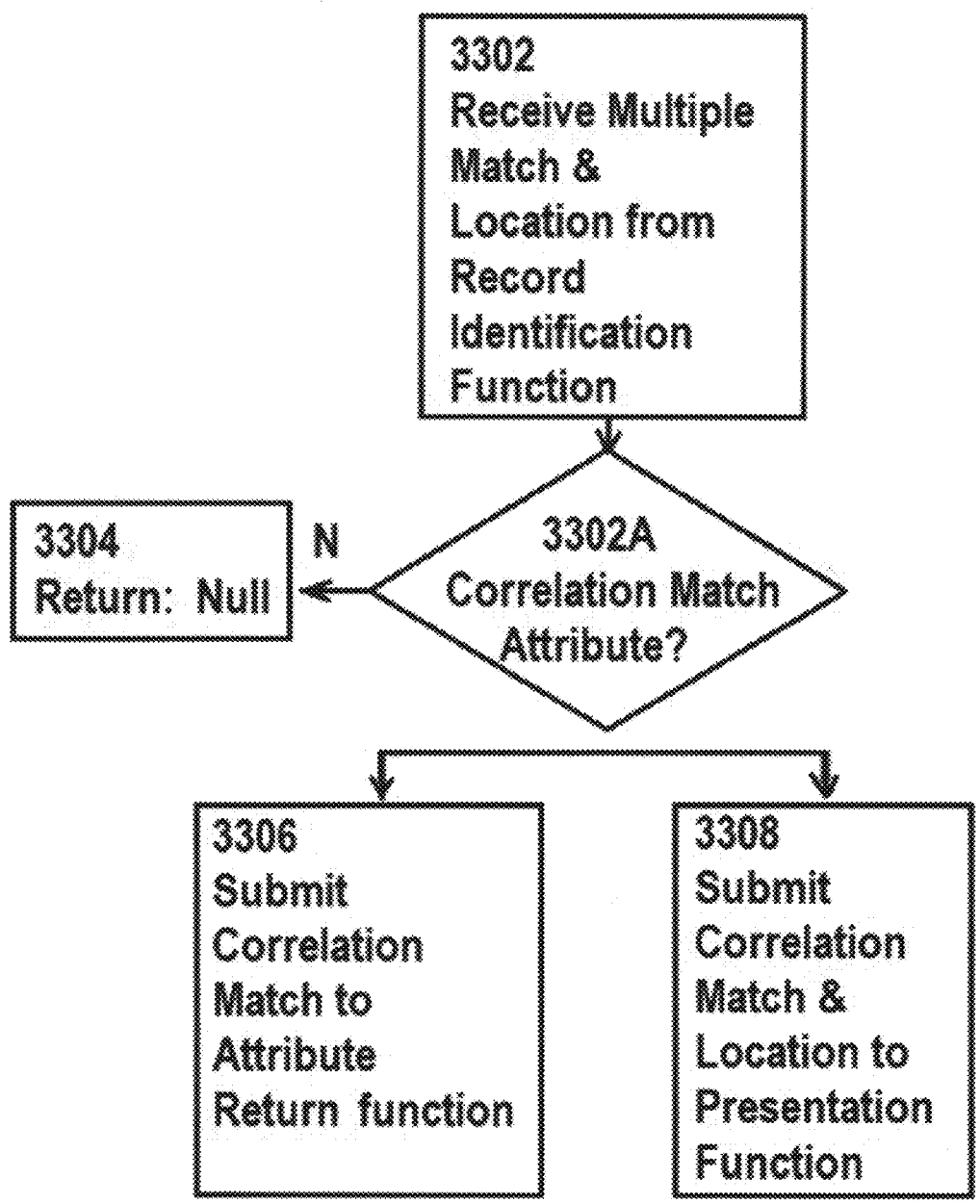
FIG. 4P is a schematic diagram breaking out and showing more specific steps to of a portion of the embodiment of FIG. 4A.

Turning to FIG. 4P, the Cross-Correlation aspect 3300 of the system 10 is shown in greater detail. The invention identifies and explores Record-Record relationships when two or more Records from user-assigned libraries are coupled. The existence and derived content of Cross Correlations between library Records feeds the Presentation Engine 4000 for display within the Content Editing or Reading phase 2000 and appears upon the server 12 and/or access device 14.

The Processing Engine 4000, in the Cross-Correlation phase 3300, administers this invention's Cross-Correlation function to identify and explore Record-Record relationships when two or more Records from user-assigned libraries are coupled. In one embodiment, coupling occurs when multiple Records that exist within the user's Library Portfolio appear and have common Record-Associated Attributes within a single Content Editing or Reading field. The existence and derived content of Cross Correlations feeds the Presentation Engine 4000 for display on the Content Editing or Reading field. Cross Correlation may occur as applicable Records emerge, or upon user command.

In a first step, Multiple Match and locations are received from the Record Identification function 3302 (See FIG. 4O, step 3204). The system 10 then determines whether there is a correlation match of the Attributes 3302A, meaning whether the multiple Records share a common Attribute association. If there is no correlation match, then the result is returned as null 3304. If there is a correlation match 3302A, either a correlation match is, depending on what further action is required, submitted to an Attribute Return function 3306 (See FIG. 4A, 3400), or a correlation match and location is submitted to the Presentation function 3208 (See FIG. 4A, 4000).

This interactive library system's Cross-Correlation features are unique in that this invention does not only return raw information but further automatically executes Cross-Correlation analysis without user action. In this way, correlations are consistently sought, identified, and presented without user intervention—thereby expanding the processing demand on the physical system to similarly expand the system and device capability and user utility.

The processing demand can be offloaded onto devices and locations additional to the at least one electronic device. These can include, for examples, one or more additional local machines, or a cloud-based or other form of computing resource. These can be in the possession of, and overseen by, a system administrator, the user, or other party.

Cross-Correlation processing is programmed to occur across Libraries automatically, by identifying Records with common associations. Specifically, the system 10 will identify the occurrence of multiple Records within the user's active content page, then will correlate all Attributes amongst said Records to look for common associations, such as common place of employment, alumni, etc.

Turning to FIG. 4Q, the features of the Attribute Return phase are discussed in greater detail. If a match is received 3402 from Record Identification 3200, or a common Attribute match is received 3404 from the Cross-Correlation function 3300, the system 10 seeks matching associated Record Attributes 3402A. Upon one or more text matches between the Record Content Editing/Reading phase 2000 and a library's text or digital signature, from either the Record identification 3402 or Cross-Correlation 3404 portions, then the associated Attributes with matches are submitted to the Presentation Engine 3408 (See FIG. 4A, 4000). This portion of the Processing Engine 3000 will retrieve associated Record Attributes and feed the Presentation Engine 4000 the matching results 3408. If there are no matching associated Record Attributes, the system 10 returns a nail search result 3406, ending the process.

It is noted that this system's Attribute Return function 3400 differs from other systems in that the system herein works with text within a webpage and/or native application. This system's focus is on taking in the meta data of the text, comparing that with the invention's database and providing relevant input to the user to influence the content of the document. Further, this system returns all associated elements within a common library.

Turning to FIGS. 4R-4U, and continuing to view FIG. 4A, the Presentation Engine 4000 is shown in greater detail. After match data is processed by the Processing Engine 3000, the Presentation Engine 4000 formats the data matches and presents the matching data as text matching one or more library data back to the Content Editing and Reading phase 2000. The Presentation Engine 4000 includes the overall functions of Record Formatting 4100, Correlation Formatting 4200, and Attribute Display 4300.

As a user works on a document or the like with the access device 14, a Presentation Icon command appears in the content, and if the user chooses to, the user can copy and insert Attributes into the Content Editing field by clicking on the applicable Presentation Icon command. The Presentation Engine 4000 (and associated sub-functions) administers presentation of data in Content Editing or Reading fields as pop-up data and commands in the content via a web or desktop interface. Presentation serves as the primary basis for system-user interaction.

The Presentation Engine 4000 also indicates relationships between numerous Records within the Content Editor or Reader field if they exist. These relationships are determined via the Processing Engine, which cross correlates multiple Records within the user-activated library(ies) that simultaneously appear within a Content Editing or Reading page 2100-2200. Similarly, such relationship appearances invite the user to recall and display detailed summaries (comprised of associated Record Attributes) when clicked. As a result, this method and apparatus establishes continual search and recall processing to improve the functionality of existing computational machinery.

Turning briefly to FIG. 4R, a sample of a Presentation interface 4010 is shown. In this example, the name of a senator has resulted in a Record match from the library, where Attributes regarding the senator are present. The Record, and associated Attributes, are matched with the Record appearing in the content of the Reading or Editing page. After matching, correlating, and processing through the other components discussed herein, the Presentation Engine 4000 results in the Attributes appearing in real-time within the document/spreadsheet being reviewed or edited by the user on the access device 14.

Turning to FIGS. 4S-4U, and continuing to view FIG. 4A, the Presentation Engine, and steps regarding it, are shown in greater detail. The Presentation Engine 4000 processes Record formatting data 4100, Correlation match data 4200, and/or Attribute information 4300.

Viewing FIG. 4S, within the Content Editing/Reading fields, Records are identified in accordance with preferences defined within the Library Management phase 1300. Record formatting is administered and managed in accordance with preferences defined by a user within Library Management 1300 and against matches identified within the Record Identification component 3200 of the interactive library system's Processing Engine 3000. For example, Record formatting could include the emergence of a select-colored underline applied to a Record recognized to have related or associated library content. Record formatting may occur as applicable Records emerge, or upon user command.

In an embodiment, library formatting data 4102 from the Library Management phase 1300, a Record match and location 4104 from the Record Identification phase 3200, active field data 4106 from the Content Editing and Reading phase 2000, or any combination of these, are forwarded. The received data or combination of data 4102, 4104, 4106, is processed to match the Record formats 4108 as Record Identification Presentation script. This Record Identification Presentation script is submitted 4110 back to the Content Editing and Reading phase 2000.

Turning to FIG. 4T, and similar to the process library formatting of FIG. 4S, Correlation Formatting data 4202 from the User Management phase 1200, a correlation match and location 4204 from the Record identification phase 3200, active field data 4206 from the Content Editing and Reading phase 2000, or any combination thereof, are forwarded. The received data or combination of data 4202, 4204, 4206, is processed to match the Correlation Formatting script 4208 as Correlation Presentation script. This Correlation Presentation script is submitted 4210 back to the Content Editing and Reading phase 2000.

Similar to Record Formatting, the Presentation Engine 4000 also administers Correlation Formatting as herein, in accordance with preferences defined within User Management, and against correlations identified within the Correlation Identification component of this invention's Processing Engine 3000. An example of Correlation Formatting may include the emergence of a select-colored background format applied to the correlated Records. Correlation Formatting may occur as applicable Records emerge, or upon user command.

Turning to FIG. 4U and similar to the Process Library formatting of FIG. 4S and Correlation Formatting of FIG. 4T, respectively, the processing of Attribute Display data is shown. User command displays Attributes 4302 from the Content Editing and Reading phase 2000, a Record location match 4304 from the Record Identification phase 3200, associated Attribute data 4306 from the Attribute Return phase 3400, or any combination thereof, are forwarded. The received data or combination of data 4302, 4304, 4306, is processed to Attribute Display script 4308. This Attribute Display script is submitted 4310 back to the Content Editing and Reading phase 2000.

Upon receiving Record-Associated Attributes for recognized content or correlations from the Processing Engine 3000, the interactive system 10 presents returned Attributes within a structured display (e.g., a table) when the user renders a positive command within the User Command function (e.g., the user clicks upon formatted content). The table or other structured display disappears upon another positive user command (e.g., a second user clicks upon the formatted content).

The Presentation Engine 4000 receives Record-Associated Attributes for recognized content or correlations from the Processing Engine 3000. These Attributes present within a structured display (e.g., table) upon positive command rendered by the user within the User Command function (e.g., user clicks upon formatted content). The table disappears upon another positive user command (e.g., second user clicks upon formatted content). This invention's Attribute Display feature herein is unique in that the present system returns structured tables and the like, with the ability to include text that links to other data, such as hyperlinked files.

Figure 5A:
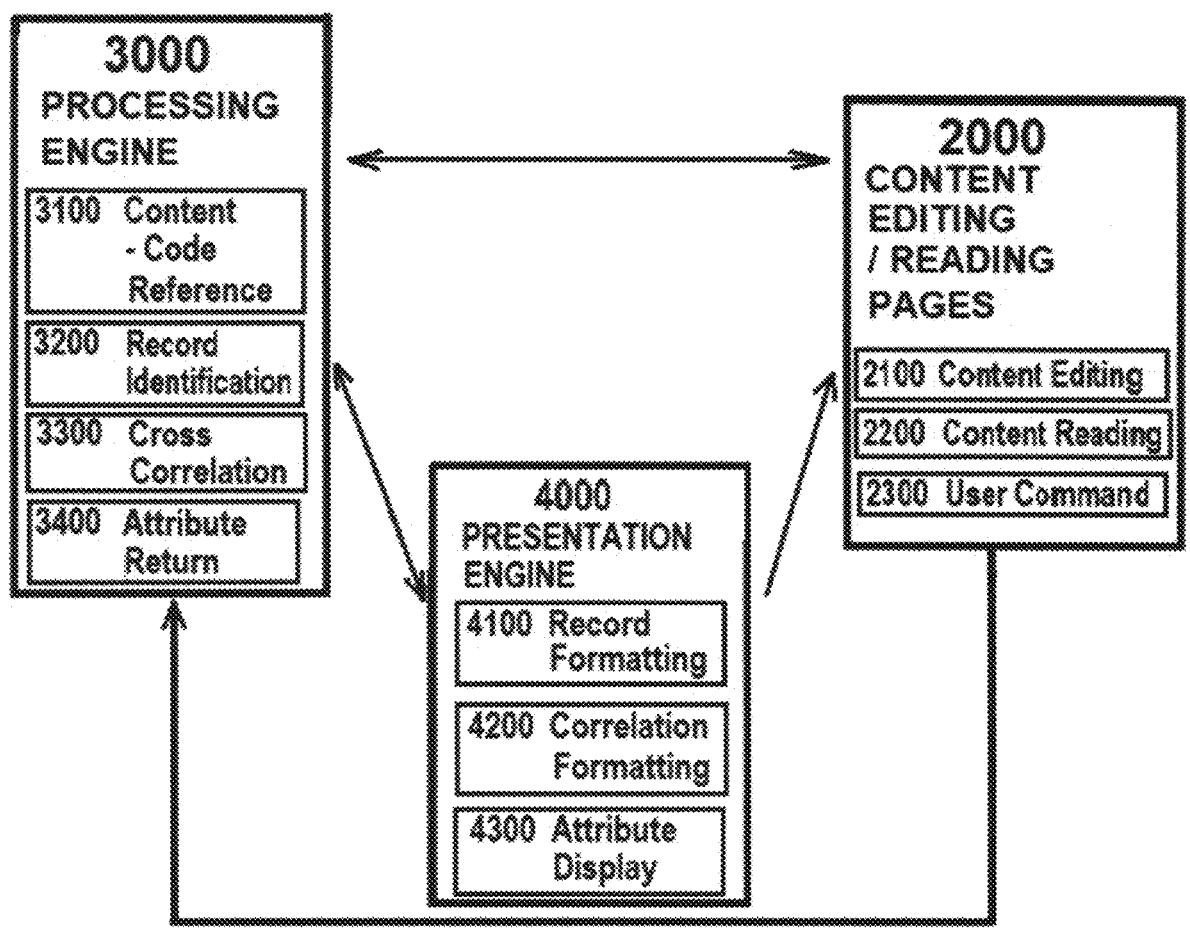
FIG. 5A is a schematic diagram featuring an alternate embodiment of the invention.
Figure 5B:
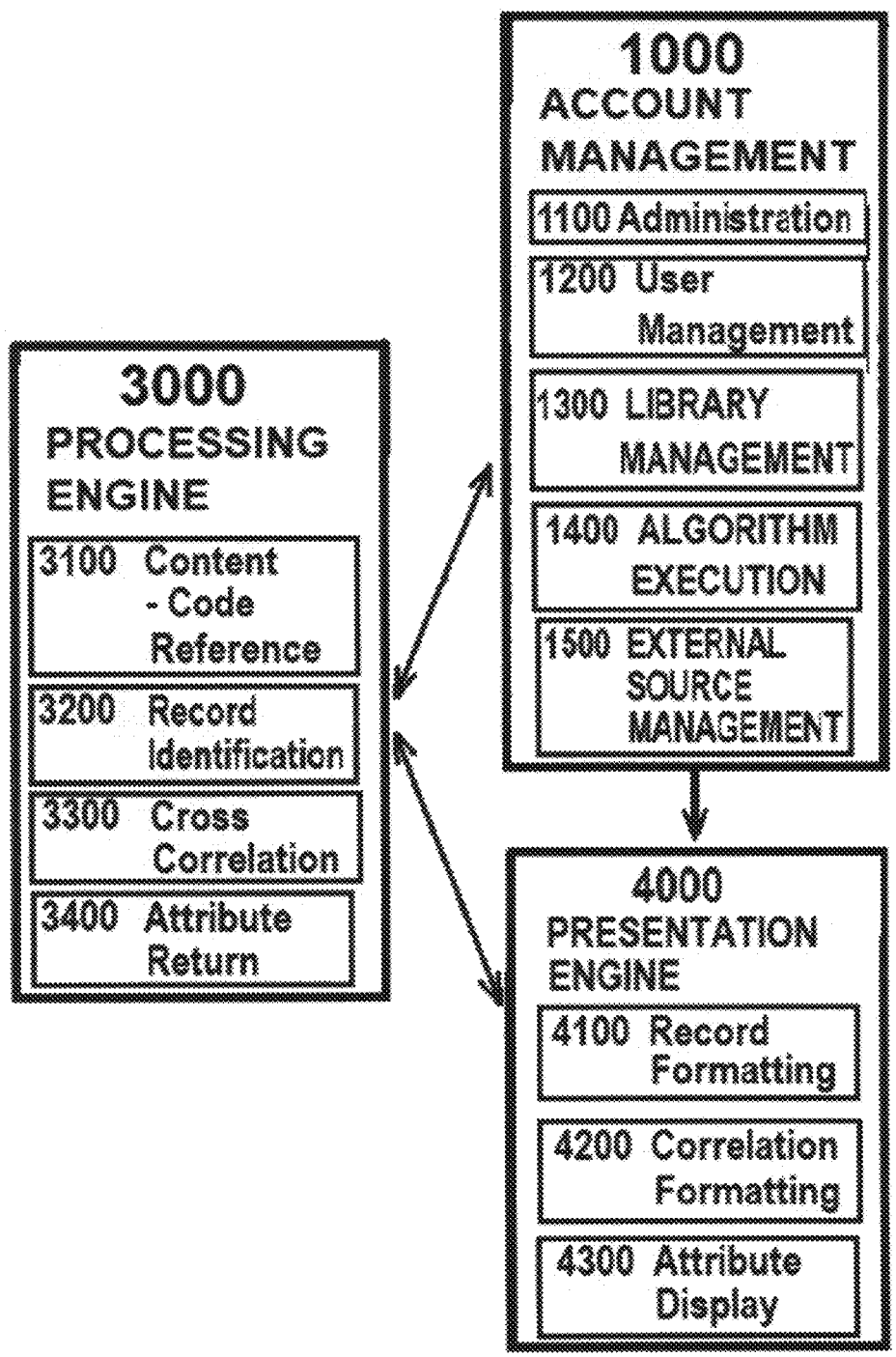
FIG. 5B is a schematic diagram featuring an alternate embodiment of the invention.
Figure 5C:
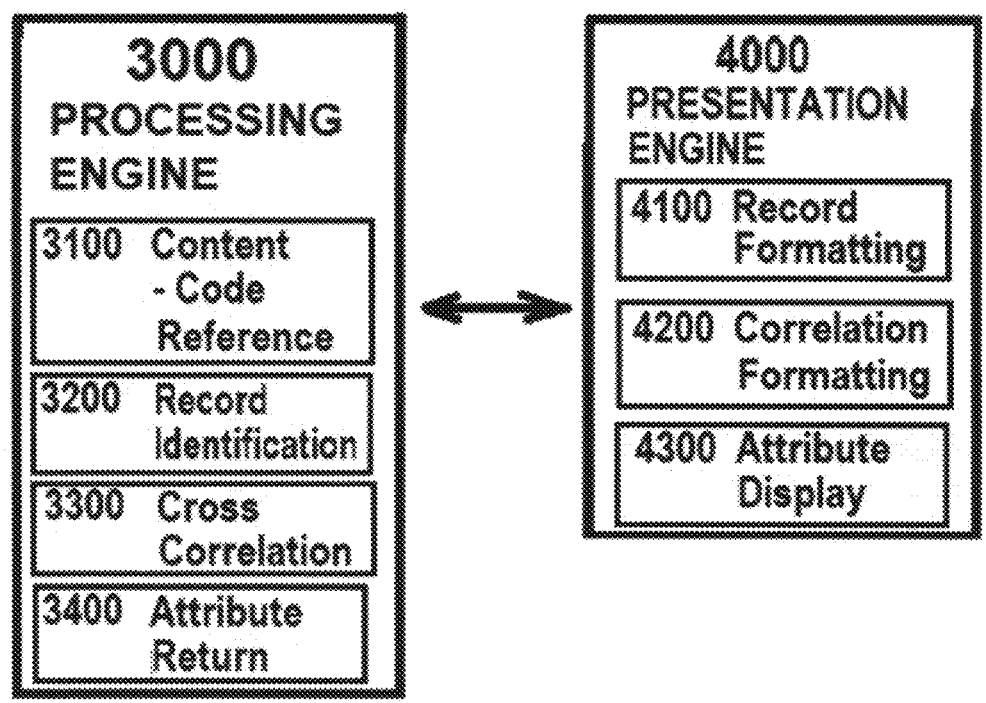
FIG. 5C is a schematic diagram featuring an alternate embodiment of the invention.

Turning to FIGS. 5A-5C, embodiments wherein the system 10 operates within a mode of more core features are shown. In these embodiments, the system is operated with the processing engine 3000 and presentation engine 4000, but other functions are abridged or automated.

Turning to FIG. 5A, a user may choose not to have an account management phase 1000 as a distinct phase. In this embodiment, the other phases of the system interact with each other. The user may elect to not have individual accounts and/or integrate these functions into the processing engine.

Turning to FIG. 5B, the Content/Editing/Reading pages 2000 are removed as a distinct phase of the system. Functions of this phase may be handled elsewhere, or at least some functions of the system deemed necessary may be incorporated into the processing engine.

Turning to FIG. 5C, a core system, with both the account management phase 1000 Content/Editing/Reading pages phase 2000, removed as distinct phases are removed. This system can conduct continuous or directed search, and may returns raw rather than correlated or processed information. This raw information can be processed or correlated by other methods, and possibly with another system, chosen by the user. This would give a user freedom to take alternate routes of working with raw data.

As shown by these embodiments, in particular the embodiment of FIG. 5C, the processing engine 3000 and presentation engine 4000, and hence the cross-correlation mechanism, can exist as a standalone system. This more limited system can intake data from any raw data source, internal or external, such as a website server, internal or user server, feeds, or other known data sources, perform analytic functions on the data as known in the art, and deliver the results to any type of user interface or presentation software known in the art (such as, e.g., those described herein).

The system 10 of these embodiments, such as the embodiments of FIGS. 5A-5C, can operate with a continuous search mechanism that reads input and identifies matching and/or related data input in the form of a wide array of digital signatures other than print. Such data searches, signatures and matches can include, for example characters that a user types into an editing window, audiovisual input from a camera or listening device or other inputs known in the art.

The continuous search mechanism can search raw data sources for exact matches, related matches, and otherwise relevant characteristics. These raw data sources can be, by programming, broad in scope. The data sources could contain libraries of data, visual information, text, audio, or a combination thereof, as well as a wide array of other datatypes more deeply described in previous documents. This raw data can then be returned to the user without any analytic phases or functions applied, and fed by the user to another software mechanism, or stored for future use. For instance, continuous search function might then be paired with a specific analytical processing device or phase tasked and programmed by the user with identifying specific insights within the raw data. This provides a system 10 with increased flexibility to users.

This capability of continuous search and retrieval of raw data augments the functionality of at least some devices or services that perform any combination of data aggregation, analysis, or presentation.

Further, while the system 10 can be programmed to perform cross-correlation and analytical functions without user action, a user can also inform and direct the invention's cross-correlation functionality for specific purposes.

The interactive library system 10 herein further provides an unbound user experience to browse and share libraries housing any form of content. While the prior art does show systems of multiple databases, which are fixed and role specific, this invention is a dynamic set of structures within an overarching database. In short, prior art solutions tend to be bound by a set, functionally-organized database structure, whereas this invention is flexible, with users afforded the ability to build any data set (i.e., library) within the overarching data schema. Unlike the modular, single-instance-type data, which can typically only be altered at a fixed location and with enough difficulty to make such previous solutions inefficient, this invention can have single or multiple instances of alterations and customized updates. Previous closed systems typically apply to a specified set of functional databases, whereas the solution herein is fully and functionally customizable.

By this invention, several purposes are achieved. In real-time, the data search, analysis, and reporting capabilities of the server 12 and/or active device 14 are greatly enhanced, resulting in users being fed deeper, more relevant information in real-time, so that each can improve their performance and do their jobs better. The system 10 proactively presents information to a user, saving the user from having to actively search and confirm information, also saving time. With this system, each device 12, 14, and by extension each user, cannot only create a library but herein has the flexibility to create the library most relevant to a user's particular position and needs in addition to creating or selecting information for retrieval most useful to them, maximizing effectiveness of data use. This further provides the benefits of helping provide consistent and informed communications, using known and trusted data sources. The immediacy and context of data presentation in real-time also help a user understand, in real-time, the relevance of data. This can improve applications such as drafting, analysis, messaging, research/study, and social engagement. In the end, this improves a user's ability to use an analyze data, providing the user with greater information insight.

Disclosed herein is an electronic machine-based system and method for improving computer functionality and real-time data availability by providing relatively seamless integration of user-defined content into a general auto-query, content search and attribute return technology functionality, for application to existing, as well as new, computer program applications, particularly Content Editing and Reading services.

It is to be understood that while certain forms of the present invention have been illustrated and described herein, the expression of these individual embodiments is for illustrative purposes and should not be seen as a limitation upon the scope of the invention. It is to be further understood that the invention is not to be limited to the specific forms or arrangements of parts described and shown.

The invention claimed is:

1. A method of providing an interactive user library system comprised of providing at least one electronic device,
   wherein the at least one electronic device is comprised of either
   a server,
   at least one access electronic device,
   a server and at least one access electronic device,
   or a combination of these,
   providing a content reading/editing phase and respective software,
   providing a processing engine phase and respective software, and
   providing a presentation engine phase and respective software,
   and wherein the content reading/editing phase is further comprised of
   a library management interface and respective library management software, capable of assisting a user in accessing a library, importing a library, creating a customized library, editing a library, managing a library, using a library, ordering a library, arranging a library, acquiring a library, assigning formats to a library, deleting a library, or any combination thereof,
   and a library management interface further comprised of at least one record field and at least one attribute field,
   and wherein the processing engine phase is further comprised of software capable of processing user-derived data by continuously comparing the user-derived data to at least one system library to determine if there are any matches between the user-derived data and the at least one system library, finding any matches, and reformatting the user-derived data to signal each match,
   an accompanying processing interface for processing text,
   and execution software capable of providing data about each matching library record by supplying attribute information about each matching library record,
   wherein the presentation engine is capable of adding match attribute information to user-derived matching text,
   and is further comprised of a respective system use interface capable of displaying attribute information of each library match to user-derived data.

2. A method of providing an interactive user library system according to claim 1, further comprising the step of programming the system to read, input, and identify matching data, near-matching data, related data, or a combination of these in the form of non-print digital signatures.

3. A method of providing an interactive user library system comprised of
   providing at least one electronic device,
   wherein the at least one electronic device is comprised of either
   a server,
   at least one access electronic device, or
   a server and at least one access electronic device,
   or a combination of these,
   providing an account management phase and respective software,
   providing a processing engine phase and respective software, and
   providing a presentation engine phase and respective software,
   wherein the account management phase is further comprised of
   interactive user library software that allows a user to access a pre-made library, create a library, import a library from an internal or external source, or any combination thereof,
   wherein the processing engine phase is further comprised of software capable of processing user-derived data by continuously comparing the user-derived data to at least one system library to determine if there are any matches between the user-derived data and the at least one system library, finding any matches, and reformatting the user-derived data to signal each match,
   an accompanying processing interface for processing text,
   and execution software capable of providing data about each matching library record by supplying attribute information about each matching library record,
   wherein the presentation engine is capable of adding match attribute information to user-derived matching text,
   and is further comprised of a respective system use interface capable of displaying attribute information of each library match to user-derived data.

4. A method of providing an interactive user library system according to claim 3, wherein the system is programmed to conduct either continuous or directed searching, and is programmed to return raw data.

5. A method of providing an interactive user library system according to claim 4, further comprising the step of adding an external system to process or process and correlate data.

6. A method of providing an interactive user library system according to claim 3, further comprising the steps of
intaking data from a raw data source,
performing at least one analytic function on the data, and delivering the results via either a user interface, presentation software, or combination of these.

7. A method of providing an interactive user library system according to claim 3, further comprising the step of programming the system to read, input, and identify matching data, near-matching data, related data, or a combination of these in the form of non-print digital signatures.

8. A method of providing an interactive user library system according to claim 3, further comprising the step of programming the system to search raw data for exact matches, related matches, or relevant characteristics,
and comprising the further step of either
returning data to a user without any analytic functions applied to the data, feeding the data into another software mechanism for further processing, or storing the data.

9. A method of providing an interactive user library system according to claim 3, wherein search results are fed into an analytical processing device programmed to conduct a specific analysis of the data.

10. A method of providing an interactive user library system comprised of
providing at least one electronic device with a user interface, the at least one electronic device comprised of either
a server and at least one access electronic device, or
at least one access electronic device,
providing a processing engine phase and respective software, and
providing a presentation engine phase and respective software,
wherein the processing engine phase is further comprised of software capable of processing user-derived data by continuously comparing the user-derived data to at least one system library to determine if there are any matches between the user-derived data and the at least one system library, finding any matches, and reformatting the user-derived data to signal each match,
an accompanying processing interface for processing text,
and execution software capable of providing data about each matching library record by supplying attribute information about each matching library record,
wherein the presentation engine is capable of adding match attribute information to user-derived matching text for user review,
and is further comprised of a respective system use interface capable of displaying attribute information of each library match to user-derived data.

11. A method of providing an interactive user library system according to claim 10, wherein the system is programmed to conduct either continuous or directed searching, and is programmed to return raw data.

12. A method of providing an interactive user library system according to claim 10, further comprising the step of adding an external system to process or process and correlate data.

13. A method of providing an interactive user library system according to claim 10, further comprising the steps of
intaking data from a raw data source,
performing at least one analytic function on the data, and delivering the results via either a user interface, presentation software, or combination of these.

14. A method of providing an interactive user library system according to claim 10, further comprising the step of programming the system to read input and identify matching data, near-matching data, related data, or a combination of these in the form of non-print digital signatures.

15. A method of providing an interactive user library system according to claim 10, further comprising the step of programming the system to search raw data for exact matches, related matches, or relevant characteristics,
and comprising the further step of either
returning data to a user without any analytic functions applied to the data, feeding the data into another software mechanism for further processing, or storing the data.

16. A method of providing an interactive user library system according to claim 10, wherein search results are fed into an analytical processing device programmed to conduct a specific analysis of the data.

\* \* \* \* \*